United States Patent
Sakurai et al.

(10) Patent No.: US 11,909,964 B2
(45) Date of Patent: Feb. 20, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventors: Hironari Sakurai, Tokyo (JP); Masaru Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 17/434,779

(22) PCT Filed: Dec. 18, 2019

(86) PCT No.: PCT/JP2019/049698
§ 371 (c)(1),
(2) Date: Aug. 30, 2021

(87) PCT Pub. No.: WO2020/183849
PCT Pub. Date: Sep. 17, 2020

(65) Prior Publication Data
US 2022/0141458 A1 May 5, 2022

(30) Foreign Application Priority Data
Mar. 8, 2019 (JP) .................. 2019-043179

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/14* (2014.11);
(Continued)

(58) Field of Classification Search
CPC .... H04N 19/117; H04N 19/119; H04N 19/14; H04N 19/176; H04N 19/186; H04N 19/46; H04N 19/86; H04N 19/96
(Continued)

(56) References Cited

U.S. PATENT DOCUMENTS

2008/0123972 A1* 5/2008 Sekiguchi .............. H04N 19/61
375/E7.149
2012/0321206 A1* 12/2012 Sato ....................... H04N 19/80
382/233
(Continued)

FOREIGN PATENT DOCUMENTS

CN  101867820 A  10/2010
CN  102823246 A  12/2012
(Continued)

OTHER PUBLICATIONS

International Search Report and Written Opinion of PCT Application No. PCT/JP2019/049698, dated Mar. 17, 2020, 12 pages of ISRWO.
(Continued)

*Primary Examiner* — Joseph G Ustaris
*Assistant Examiner* — Matthew David Kim
(74) *Attorney, Agent, or Firm* — CHIP LAW GROUP

(57) ABSTRACT

A depth value calculation unit (102) calculates, for an image divided into a plurality of blocks, a depth value (Da, Db) for determining presence or absence of processing of a deblocking filter and determining strength of the deblocking filter according to a division state of respective blocks adjacent to a block boundary (Bv). A filter processing execution determination unit (104) determines whether or not to cause the deblocking filter to operate on the block boundary (Bv) on the basis of the depth value (Da, Db). A filter strength setting unit (105) sets the strength of the deblocking filter to operate
(Continued)

on the block boundary (Bv) on the basis of the depth value (Da, Db).

16 Claims, 23 Drawing Sheets

(51) Int. Cl.
  *H04N 19/14* (2014.01)
  *H04N 19/176* (2014.01)
  *H04N 19/186* (2014.01)
  *H04N 19/46* (2014.01)
  *H04N 19/86* (2014.01)
  *H04N 19/96* (2014.01)

(52) U.S. Cl.
  CPC ......... *H04N 19/176* (2014.11); *H04N 19/186* (2014.11); *H04N 19/46* (2014.11); *H04N 19/86* (2014.11); *H04N 19/96* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 2013/0202048 A1* | 8/2013 | Kim | H04N 19/86 375/E7.189 |
| 2014/0023277 A1* | 1/2014 | Takahashi | H04N 21/44008 382/190 |
| 2015/0237351 A1* | 8/2015 | Lee | H04N 19/156 375/240.26 |
| 2016/0029038 A1* | 1/2016 | Zhao | H04N 19/50 375/240.12 |
| 2016/0165241 A1* | 6/2016 | Park | H04N 19/136 375/240.08 |
| 2017/0164003 A1* | 6/2017 | Lee | H04N 5/2226 |
| 2017/0310994 A1* | 10/2017 | Seo | H04N 19/176 |
| 2018/0160113 A1* | 6/2018 | Jeong | H04N 19/176 |
| 2019/0200016 A1* | 6/2019 | Jang | H04N 19/96 |
| 2020/0007760 A1* | 1/2020 | Yokokawa | H04N 25/134 |

FOREIGN PATENT DOCUMENTS

| | | |
|---|---|---|
| CN | 109891895 A | 6/2019 |
| EP | 1928184 A | 6/2008 |
| EP | 3503556 A1 | 6/2019 |
| JP | 2010-110007 A | 5/2010 |
| JP | 2014-176039 A | 9/2014 |
| JP | 2019-525671 A | 9/2019 |
| KR | 10-2010-0097232 A | 9/2010 |
| KR | 10-2019-0034276 A | 4/2019 |
| RU | 2011119121 A1 | 11/2012 |
| WO | 2011/125729 A1 | 10/2011 |
| WO | 2018/038492 A1 | 3/2018 |

OTHER PUBLICATIONS

Bross, et al., "Versatile Video Coding (Draft 3)", Joint Video Experts Team (JVET) of ITU-T SG 16 WP 3 and ISO/IEC JTC 1/SC 29/WG 11, 12th Meeting, Macao, China, Oct. 3-12, 2018.

* cited by examiner

FIG. 7

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| $\beta'$ | 0 | 0 | 0 | 0 | 0 | 0 | 0 | 0 | 0 | 0 | 0 | 0 | 0 | 0 | 0 | 0 | 0 |
| $t_c'$ | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| $\beta'$ | 7 | 8 | 9 | 10 | 11 | 12 | 13 | 14 | 15 | 16 | 17 | 18 | 20 | 22 | 24 | 26 | 28 |
| $t_c'$ | 0 | 1 | 1 | 1 | 1 | 1 | 1 | 1 | 1 | 1 | 2 | 2 | 2 | 2 | 3 | 3 | 3 |
| Q | 34 | 35 | 36 | 37 | 38 | 39 | 40 | 41 | 42 | 43 | 44 | 45 | 46 | 47 | 48 | 49 | 50 |
| $\beta'$ | 30 | 32 | 34 | 36 | 38 | 40 | 42 | 44 | 46 | 48 | 50 | 52 | 54 | 56 | 58 | 60 | 62 |
| $t_c'$ | 3 | 4 | 4 | 4 | 5 | 5 | 6 | 6 | 7 | 8 | 9 | 10 | 11 | 13 | 14 | 16 | 18 |
| Q | 51 | 52 | 53 | 54 | 55 | 56 | 57 | 58 | 59 | 60 | 61 | 62 | 63 | 64 | 65 | | |
| $\beta'$ | 64 | 66 | 68 | 70 | 72 | 74 | 76 | 78 | 80 | 82 | 84 | 86 | 88 | – | – | | |
| $t_c'$ | 20 | 22 | 25 | 28 | 31 | 35 | 39 | 44 | 50 | 56 | 63 | 70 | 79 | 88 | 99 | | |

| qP  | <30 | 30 | 31 | 32 | 33 | 34 | 35 | 36 | 37 | 38 | 39 | 40 | 41 | 42 | 43 | >43 |
|-----|-----|----|----|----|----|----|----|----|----|----|----|----|----|----|----|-----|
| Qpc | =qP | 29 | 30 | 31 | 32 | 33 | 33 | 34 | 34 | 35 | 35 | 36 | 36 | 37 | 37 | =qP−6 |

```
slice_header( ) {
    ...
    if( deblocking_filter_override_enabled_flag )
        deblocking_filter_override_flag
    if( deblocking_filter_override_flag ) {
        slice_deblocking_filter_disabled_flag
        if( !slice_deblocking_filter_disabled_flag ) {
            slice_beta_offset_div2
            slice_tc_offset_div2
            slice_deblocking_filter_delta_enabled_flag
            if( slice_deblocking_filter_delta_enabled_flag ) {
                diff_deblocking_filter_delta_depth
                for( i=0; i<diff_deblocking_filter_delta_depth; i++ ) {
                    slice_beta_offset_div2_delta[i]
                    slice_tc_offset_div2_delta[i]
                }
            }
        }
    }
}
```

FIG. 12B

```
pic_parameter_set_rbsp( ) {
...
  deblocking_filter_control_present_flag
  if( deblocking_filter_control_present_flag ) {
    deblocking_filter_override_enabled_flag
    pps_deblocking_filter_disabled_flag
    if( !pps_deblocking_filter_disabled_flag ) {
      pps_beta_offset_div2
      pps_tc_offset_div2
      pps_deblocking_filter_delta_enabled_flag
      if( pps_deblocking_filter_delta_enabled_flag ) {
        diff_deblocking_filter_delta_depth
        for( i=0; i<diff_deblocking_filter_delta_depth; i++ ) {
          pps_beta_offset_div2_delta[i]
          pps_tc_offset_div2_delta[i]
        }
      }
    }
  }
}
```

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2019/049698 filed on Dec. 18, 2019, which claims priority benefit of Japanese Patent Application No. JP 2019-043179 filed in the Japan Patent Office on Mar. 8, 2019. Each of the above-referenced applications is hereby incorporated herein by reference in its entirety.

TECHNICAL FIELD

The present disclosure relates to an information processing device, an information processing method, and a program, and more particularly relates to an information processing device, an information processing method, and a program capable of causing an appropriate deblocking filter to operate according to a state of an image.

BACKGROUND ART

The Joint Video Experts Team (JVET) is established with an aim to standardize a new video codec exceeding High Efficiency Video Coding (HEVC), and movement to standardize a new video codec, Versatile Video Coding (VVC) is accelerating (for example, Non-Patent Document 1). Conventionally, in the HEVC, filtering processing using a deblocking filter has been performed in order to reduce block noise generated in a prediction unit block (prediction unit (PU)).

CITATION LIST

Non-Patent Document

Non-Patent Document 1: Benjamin Bross, et al., "Versatile Video Coding (Draft 3)", Joint Video Experts Team (JVET) of ITU-T SG 16 WP 3 and ISO/IECJTC 1/SC 29/WG 11, 12th Meeting, Macao, CN, 3-12 Oct. 2018

SUMMARY OF THE INVENTION

Problems to be Solved by the Invention

However, in the VVC, the maximum size of a block for prediction increases as compared with the HEVC, and thus the magnitude of block noise may increase at a boundary of blocks.

Accordingly, the present disclosure proposes an information processing device, an information processing method, and a program capable of causing an appropriate deblocking filter to operate according to a state of an image.

Solutions to Problems

In order to solve the above problem, an information processing device according to an aspect of the present disclosure is an information processing device including a depth value calculation unit that calculates, for an image divided into a plurality of blocks, a depth value according to a division state of respective blocks adjacent to a block boundary, a filter processing execution determination unit that determines whether or not to cause a deblocking filter to operate on the block boundary on the basis of the depth value, and a filter strength setting unit that sets the strength of the deblocking filter to operate on the block boundary on the basis of the depth value.

BRIEF DESCRIPTION OF DRAWINGS

FIG. 7 is a diagram illustrating an example of a threshold setting table for setting a threshold β and a threshold tc.

FIG. 8 is an example of a correction table of a qP value set when filtering a color difference signal.

FIG. 12A is a diagram illustrating an example of a slice header storing setting information related to a deblocking filter.

FIG. 12B is a diagram illustrating an example of a picture parameter set storing setting information related to the deblocking filter.

MODE FOR CARRYING OUT THE INVENTION

Figure 1:
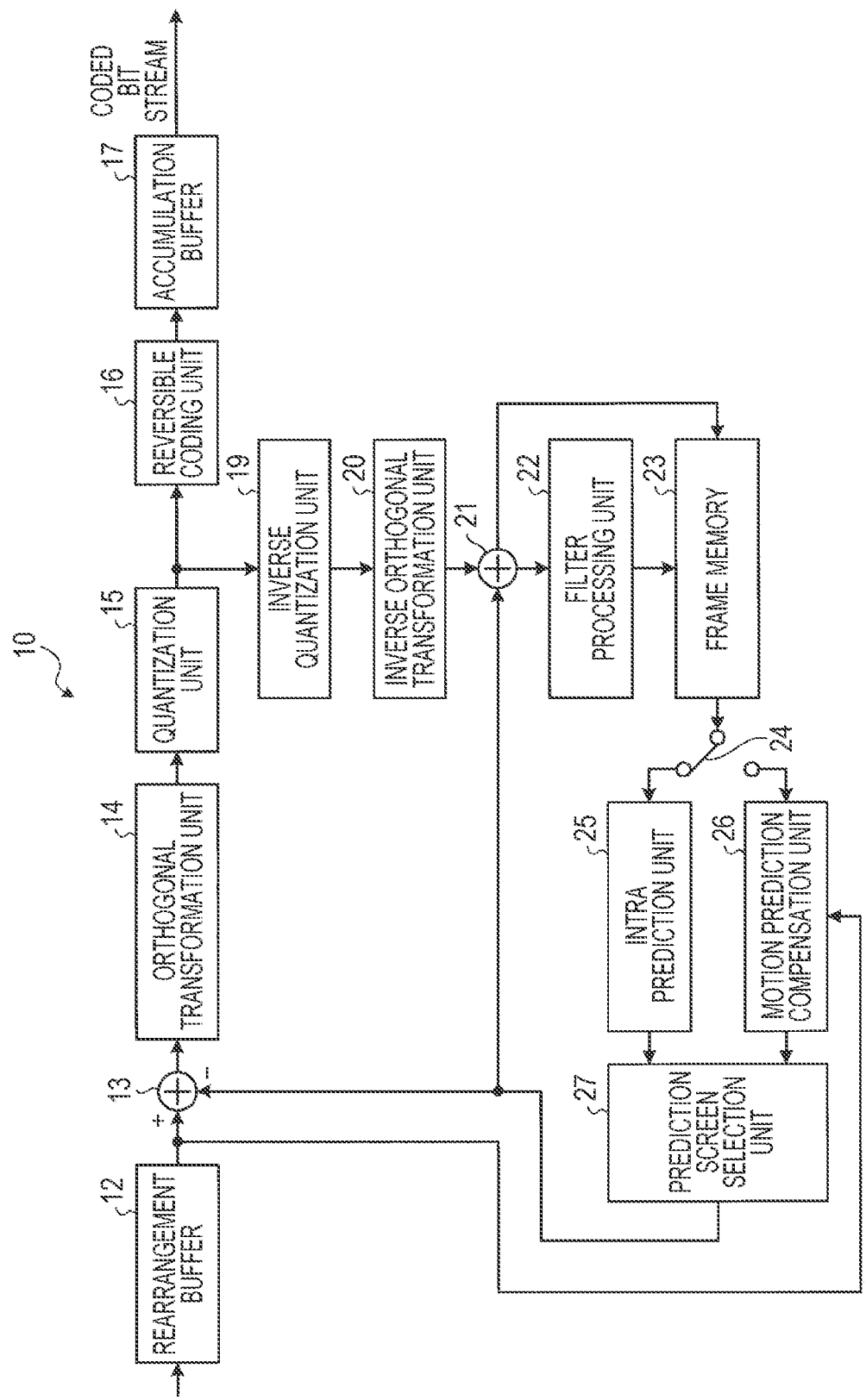
FIG. 1 is a diagram illustrating a configuration of an image coding device of a first embodiment of the present disclosure.

Hereinafter, embodiments of the present disclosure will be described in detail on the basis of the drawings. Note that in each of the following embodiments, the same parts are denoted by the same reference numerals, and redundant description will be omitted.

Furthermore, the present disclosure will be described according to the following order of items.
1. First Embodiment
1-1. Configuration of image coding device
1-2. Operation of image coding device
1-3. Description of block division of image
1-4. Description of filter processing unit
  1-4-1. Description of deblocking filter
  1-4-2. Description of strength adjustment of deblocking filter
  1-4-3. Description of method of setting threshold β and threshold tc
  1-4-4. Description of strong and weak filters
  1-4-5. Description of filtering method for color difference signal
1-5. Description of functional configuration of filter processing unit of first embodiment
1-6. Description of method for transmitting setting information related to deblocking filter
1-7. Description of operation of filter processing unit
1-8. Effects of first embodiment
2. Second Embodiment
2-1. Configuration of image decoding device
2-2. Operation of image decoding device
2-3. Description of functional configuration of filter processing unit of second embodiment
2-4. Description of operation of filter processing unit
2-5. Effects of second embodiment
3. Third Embodiment
3-1. Description of functional configuration of filter processing unit
3-2. Description of operation of filter processing unit
3-3. Effects of third embodiment
4. Fourth Embodiment
4-1. Description of functional configuration of filter processing unit
4-2. Description of operation of filter processing unit
4-3. Effects of fourth embodiment
5. Fifth Embodiment
5-1. Description of functional configuration of filter processing unit
5-2. Description of operation of filter processing unit
5-3. Effects of fifth embodiment
6. Description of hardware configuration 1. First Embodiment Conventionally, when filtering processing using a deblocking filter is performed, to cause the filter to operate or not and strength of the filter to operate are determined only on the basis of a distribution state of pixel values in an image. However, because the image is divided into blocks of different sizes and each block is coded independently, when uniform filtering is performed, block noise may occur in a coarse block (large block). Furthermore, there is a problem that texture may be lost in a fine block (small block).

Accordingly, it has not been possible to cause the deblocking filter according to the state of block division of the image to operate.

A first embodiment of the present disclosure is an example of an image coding device 10 that controls operation of the deblocking filter according to a state of block division in the image. Note that the image coding device 10 is an example of an information processing device in the present disclosure.

1-1. Configuration of Image Coding Device

FIG. 1 is a diagram illustrating a configuration of an image coding device of the first embodiment of the present disclosure. The image coding device 10 includes a rearrangement buffer 12, a subtraction unit 13, an orthogonal transformation unit 14, a quantization unit 15, a reversible coding unit 16, and an accumulation buffer 17. Moreover, the image coding device 10 further includes an inverse quantization unit 19, an inverse orthogonal transformation unit 20, an addition unit 21, a filter processing unit 22, a frame memory 23, a selector 24, an intra prediction unit 25, a motion prediction compensation unit 26, and a prediction image selection unit 27.

The image rearrangement buffer 12 rearranges frames of a series of images constituting a video to be coded according to a group of pictures (GOP) structure related to coding processing, and outputs image data after rearrangement to the subtraction unit 13 and the motion prediction compensation unit 26.

The subtraction unit 13 is supplied with the image data output from the rearrangement buffer 12 and prediction image data selected by the prediction image selection unit 27 as described later. The subtraction unit 13 calculates prediction error data that is a difference between the image data output from the rearrangement buffer 12 and the prediction image data supplied from the prediction image selection unit 27, and outputs the prediction error data to the orthogonal transformation unit 14.

The orthogonal transformation unit 14 performs orthogonal transformation processing such as discrete cosine transformation (DCT) on the prediction error data output from the subtraction unit 13, or Karhunen-Loeve (KL) transformation. The orthogonal transformation unit 14 outputs transformation coefficient data obtained by performing the orthogonal transformation processing to the quantization unit 15.

The transformation coefficient data output from the orthogonal transformation unit 14 is supplied to the quantization unit 15. The quantization unit 15 quantizes the transformation coefficient data and outputs quantized data to the reversible coding unit 16 and the inverse quantization unit 19.

The reversible coding unit 16 is supplied with the quantized data output from the quantization unit 15 and prediction mode information from the intra prediction unit 25, the motion prediction compensation unit 26, and the prediction image selection unit 27 as described later. Note that the prediction mode information includes a macroblock type, a prediction mode, motion vector information, reference picture information, and the like that enable identification of a prediction block size according to intra prediction or inter prediction. The reversible coding unit 16 performs reversible coding processing on the quantized data by, for example, variable-length coding, arithmetic coding, or the like, generates a coded bit stream, and outputs the coded bit stream to the accumulation buffer 17. Furthermore, the reversible coding unit 16 also performs reversible coding on the prediction mode information, and adds the prediction mode information to header information of the coded bit stream.

The accumulation buffer 17 accumulates the coded bit stream output from the reversible coding unit 16. Furthermore, the accumulation buffer 17 outputs the accumulated coded bit stream at a transmission speed corresponding to a transmission path.

The inverse quantization unit 19 performs inverse quantization processing of the quantized data supplied from the quantization unit 15. The inverse quantization unit 19 outputs transformation coefficient data obtained by performing the inverse quantization processing to the inverse orthogonal transformation unit 20.

The inverse orthogonal transformation unit 20 performs inverse orthogonal transformation processing on the transformation coefficient data supplied from the inverse quantization unit 19 to restore a prediction error. The inverse orthogonal transformation unit 20 outputs data obtained by the inverse orthogonal transformation processing to the addition unit 21.

The addition unit 21 adds prediction error data supplied from the inverse orthogonal transformation unit 20 and the prediction image data supplied from the prediction image selection unit 27 to generate decoded image data, and outputs the decoded image data to the filter processing unit 22.

The filter processing unit 22 applies a series of filter processing for the purpose of improving image quality of the decoded image. For example, the filter processing unit includes four filters (bilateral filter, deblocking filter, adaptive offset filter, and adaptive loop filter). In the filter processing, four or one of them is selectively applied. Note that, in FIG. 1, it is assumed a case where processing of the deblocking filter is performed in the filter processing unit 22.

The filter processing unit 22 that causes the deblocking filter to operate performs filter processing for reducing block noise generated at the time of coding an image. The filter processing unit 22 performs filter processing (smoothing processing) of removing block noise from the decoded image data supplied from the addition unit 21, and outputs the image data after the filter processing to the frame memory 23.

The frame memory 23 retains a decoded image before the filter processing input from the addition unit 21 and the decoded image data after the filter processing supplied from the filter processing unit 22 using a recording medium.

The selector 24 reads the decoded image data before the filter processing from the frame memory 23 in order to perform intra prediction, and supplies the read decoded image data to the intra prediction unit 25 as reference image data. Furthermore, the selector 24 reads the decoded image after the filter processing from the frame memory 23 in order to perform inter prediction, and supplies the read decoded image data to the motion prediction compensation unit 26 as reference image data.

The intra prediction unit 25 uses the reference image data before the filter processing read from the frame memory 23 to perform intra prediction processing in all candidate intra prediction modes. Moreover, the intra prediction unit 25 calculates a cost function value for each intra prediction mode, and selects, as an optimum intra prediction mode, an intra prediction mode having the smallest calculated cost function value, that is, an intra prediction mode with the best coding efficiency. The intra prediction unit 25 outputs the prediction image data generated in the optimum intra prediction mode and the prediction mode information regarding the optimum intra prediction mode, and the cost function value in the optimum intra prediction mode to the prediction image selection unit 27.

The motion prediction compensation unit 26 performs motion prediction and compensation processing on the basis of the image data of the image to be coded output from the rearrangement buffer 12 and the reference image data read from the frame memory 23. Specifically, the motion prediction compensation unit 26 detects a motion vector for each image of each prediction block size in the image to be coded read from the rearrangement buffer 12, using the reference image data after the filter processing read from the frame memory 23. Moreover, the motion prediction compensation unit 26 performs motion compensation processing on the decoded image on the basis of the detected motion vector to generate a prediction image. Furthermore, the motion prediction compensation unit 26 calculates a cost function value for each prediction block size, and selects, as an optimum inter prediction mode, a prediction block size having the smallest calculated cost function value, that is, a prediction block size with the best coding efficiency. The motion prediction compensation unit 26 outputs the prediction image data generated in the optimum inter prediction mode and the prediction mode information regarding the optimum inter prediction mode, and the cost function value in the optimum inter prediction mode to the prediction image selection unit 27.

The prediction image selection unit 27 compares the cost function value supplied from the intra prediction unit 25 with the cost function value supplied from the motion prediction compensation unit 26 in units of blocks, and selects one with a smaller cost function value as an optimum mode with the best coding efficiency. Furthermore, the prediction image selection unit 27 outputs the prediction image data generated in the optimum mode to the subtraction unit 13 and the addition unit 21. Moreover, the prediction image selection unit 27 outputs the prediction mode information of the optimum mode to the reversible coding unit 16. Note that the prediction image selection unit 27 may perform the intra prediction or inter prediction in units of slices.

1-2. Operation of Image Coding Device

Figure 2:
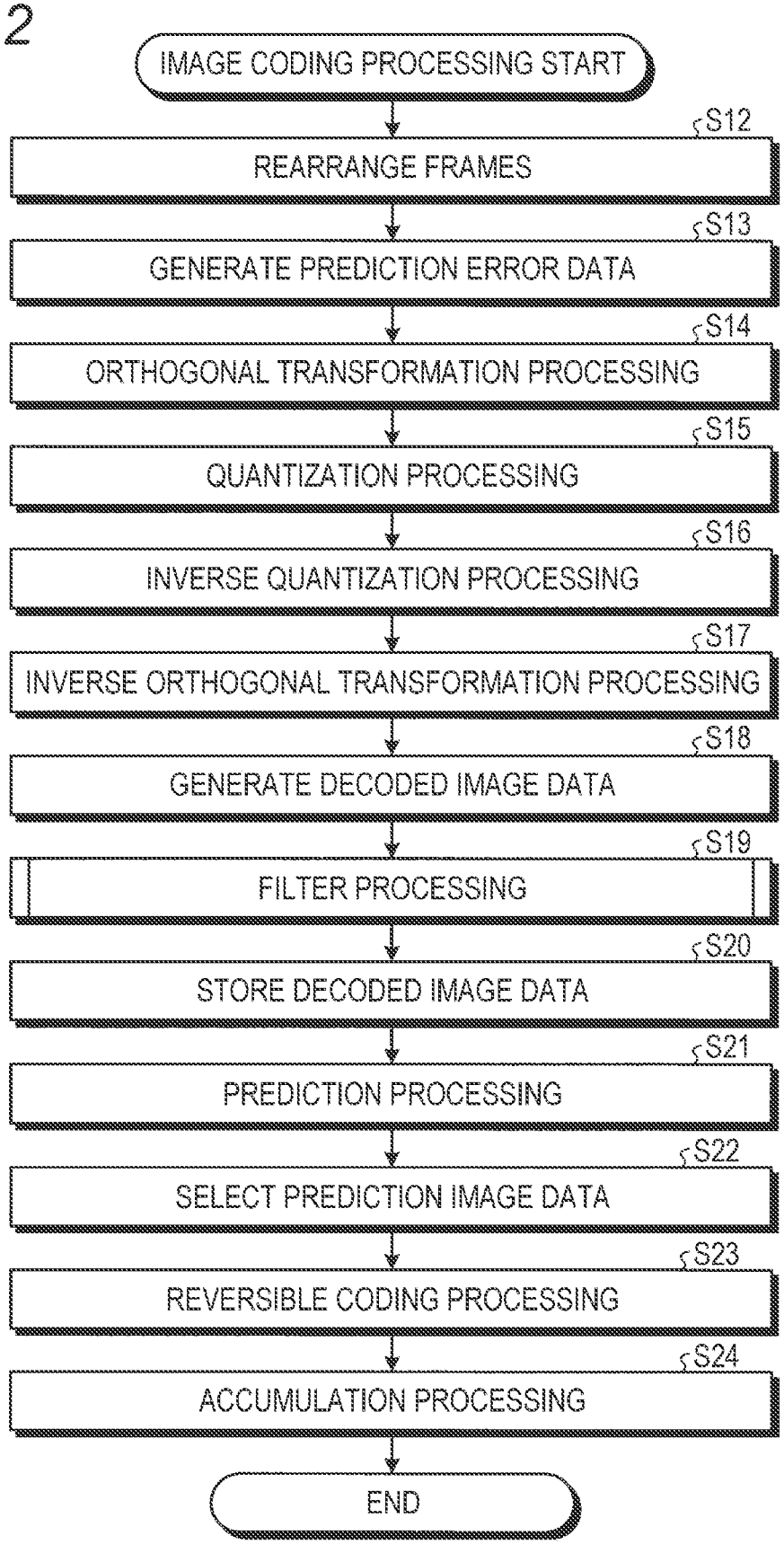
FIG. 2 is a flowchart illustrating a flow of image coding processing.

FIG. 2 is a flowchart illustrating a flow of image coding processing.

In step S12, the rearrangement buffer 12 rearranges frames. The rearrangement buffer 12 performs rearrangement from the order of display of each picture to the order of coding.

In step S13, the subtraction unit 13 generates prediction error data. The subtraction unit 13 calculates a difference between the image data of the frames rearranged in step S12 and the prediction image data selected by the prediction image selection unit 27 to generate the prediction error data. The prediction error data has a smaller data amount than the original image data. Therefore, the amount of data can be compressed as compared with a case where an image is coded as it is.

In step S14, the orthogonal transformation unit 14 performs the orthogonal transformation processing. The orthogonal transformation unit 14 orthogonally transforms the prediction error data output from the subtraction unit 13. Specifically, orthogonal transformation such as discrete cosine transformation or Karhunen-Loeve transformation is performed on the prediction error data, and the transformation coefficient data is output.

In step S15, the quantization unit 15 performs quantization processing. The quantization unit 15 quantizes the transformation coefficient data. At the time of quantization, rate control is performed as described in processing of step S25 as described later.

In step S16, the inverse quantization unit 19 performs the inverse quantization processing. The inverse quantization unit 19 inversely quantizes the transformation coefficient data quantized by the quantization unit 15 with a characteristic corresponding to a quantization characteristic of the quantization unit 15.

In step S17, the inverse orthogonal transformation unit 20 performs the inverse orthogonal transformation processing. The inverse orthogonal transformation unit 20 inversely orthogonally transforms the transformation coefficient data inversely quantized by the inverse quantization unit 19 with a characteristic corresponding to a transformation characteristic of the orthogonal transformation unit 14.

In step S18, the addition unit 21 generates the decoded image data. The addition unit 21 adds the prediction image data supplied from the prediction image selection unit 27 and the image data after the inverse orthogonal transformation of a position corresponding to the prediction image data to generate the decoded image data.

Figure 13:
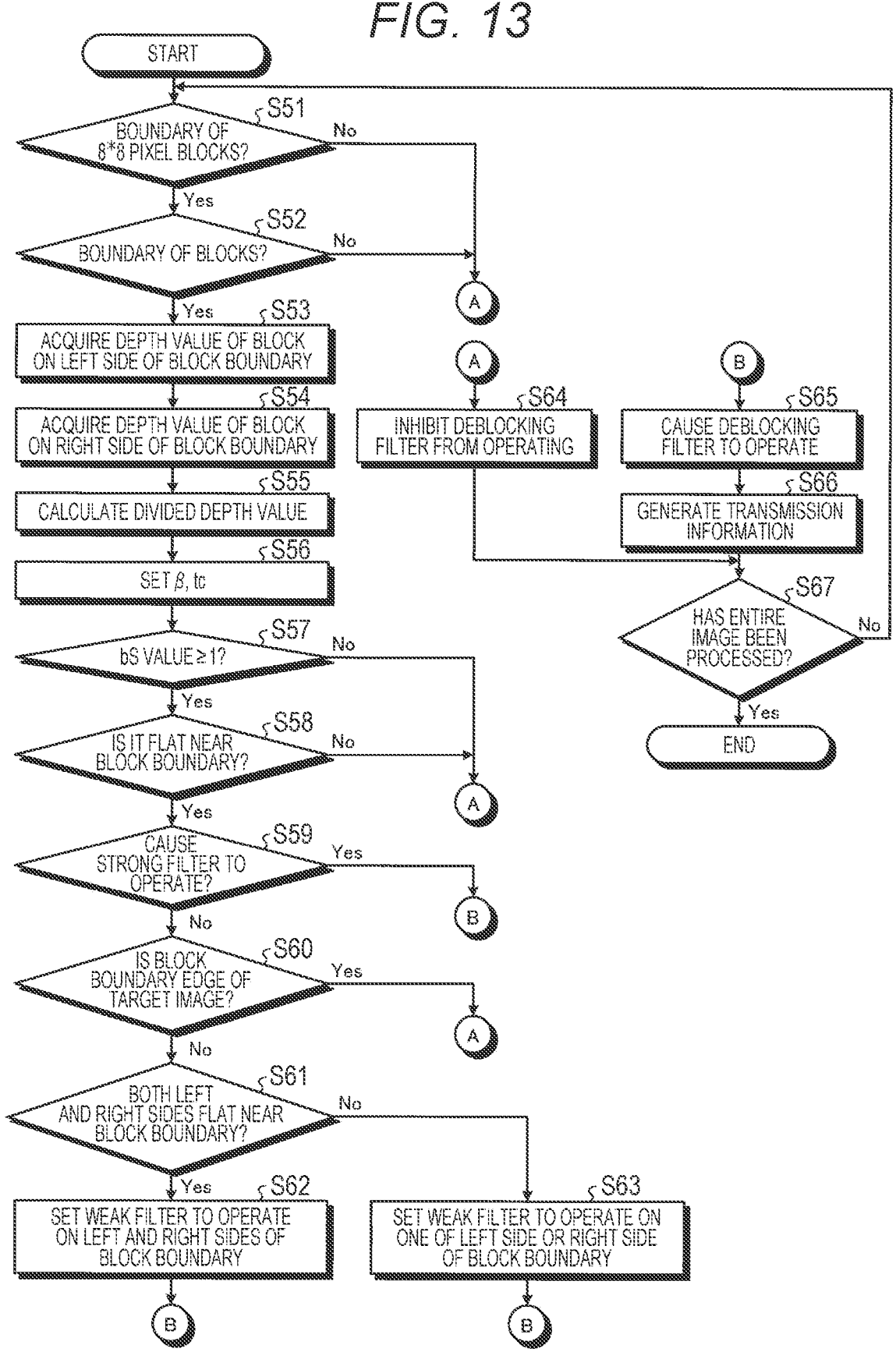
FIG. 13 is a flowchart illustrating an example of a flow of processing performed by the filter processing unit according to the first embodiment.

In step S19, the filter processing unit 22 performs deblocking filter processing. The filter processing unit 22 filters the decoded image data output from the addition unit 21 to remove the block noise. Note that contents of the processing performed by the filter processing unit 22 will be described later in detail (FIG. 13).

In step S20, the frame memory 23 stores the decoded image data. The frame memory 23 stores the decoded image data before the deblocking filter processing.

In step S21, the intra prediction unit 25 and the motion prediction compensation unit 26 each perform prediction processing. That is, the intra prediction unit 25 performs the intra prediction processing in an intra prediction mode, and the motion prediction compensation unit 26 performs motion prediction and compensation processing in the inter prediction mode. By this processing, the prediction processing in each of all prediction modes to be candidates is performed, and the cost function value in each of all the prediction modes to be candidates is calculated. Then, the optimum intra prediction mode and the optimum inter prediction mode are selected on the basis of the calculated cost function value, and the prediction image generated in the selected prediction mode and a cost function and the prediction mode information thereof are supplied to the prediction image selection unit 27.

In step S22, the prediction image selection unit 27 selects the prediction image data. On the basis of the respective cost function values output from the intra prediction unit 25 and the motion prediction compensation unit 26, the prediction image selection unit 27 determines the optimum mode with the best coding efficiency. Moreover, the prediction image selection unit 27 selects the prediction image data of the determined optimum mode, and supplies the prediction image data to the subtraction unit 13 and the addition unit 21. As described above, this prediction image is used in the processing of steps S13 and S18.

In step S23, the reversible coding unit 16 performs the reversible coding processing. The reversible coding unit 16 performs the reversible coding on the quantized data output from the quantization unit 15. That is, the reversible coding such as variable-length coding or arithmetic coding is performed on the quantized data, and the data is compressed. At this time, the prediction mode information (including macroblock type, prediction mode, motion vector information, reference picture information, and the like, for example) and the like input to the reversible coding unit 16 in step S22 described above are also subjected to the reversible coding. Moreover, reversibly coded data of the prediction mode information is added to the header information of the coded bit stream generated by the reversible coding of the quantized data.

In step S24, the accumulation buffer 17 performs accumulation processing of accumulating coded bit streams. The coded bit streams accumulated in the accumulation buffer 17 are appropriately read and transmitted to the decoding side via a transmission path.

1-3. Description of Block Division of Image

In the VVC method, image coding processing is performed in units of square pixel blocks called coding tree units (CTUs). The size of a CTU is 128*128 pixels in the case of the VVC method.

A series of processing such as intra prediction, inter prediction, orthogonal transformation, and quantization described above is performed in coding units (CU) obtained by recursively dividing the CTU into variable block sizes, or in units of blocks obtained by further dividing a CU on the basis of a block size of a processing unit specified in advance. In a case where a distribution of luminance values in the image is flat, the size of the CU is determined to be large. On the other hand, in a case where the distribution of the luminance values in the image is complicated, the size of the CU is determined to be small. By determining the size of the CU in this manner, the image coding device 10 of the VVC method can increase the coding efficiency.

In the VVC method, these block divisions are performed according to a quad tree structure and a multi-tree structure (binary tree or ternary tree). For example, an image of 128*128 pixels may be divided into CUs of 64*64 pixels, 32*32 pixels, 16*16 pixels, and 8*8 pixels in sequence according to the quad tree data structure. Then, a depth value indicating the depth of a block is defined for each layer of division. For example, the CTU of 128*128 pixels has a depth value=0. Then, the CU of 64*64 pixels has a depth value=1, the CU of 32*32 pixels has a depth value=2, the CU of 16*16 pixels has a depth value=3, and the CU of 8*8 pixels has a depth value=4.

On the other hand, also in a case where the CU is divided according to the multi-tree structure, the depth value is similarly defined for each layer of division.

Figure 3:
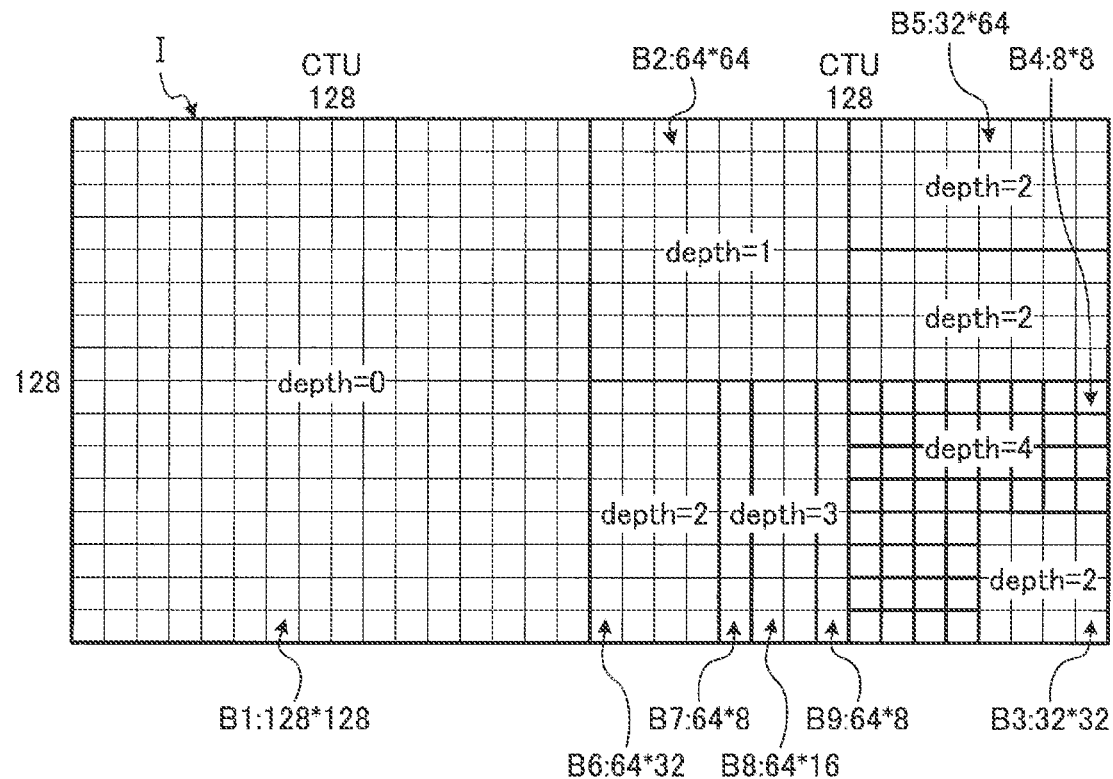
FIG. 3 is a diagram illustrating an example of block division in a VVC method.

FIG. 3 is a diagram illustrating an example of block division in the VVC method. In FIG. 3, a block B1 of an image I has a size of 128*128 pixels, and has a depth value (depth)=0. A block B2 has a size of 64*64 pixels, and a depth value=1. A block B3 has a size of 32*32 pixels, and a depth value=2. A block B4 has a size of 8*8 pixels, and a depth value=4.

Moreover, a block B5 is an example in which a region of 64*64 pixels is divided into regions of 32*64 pixels according to the binary tree structure. The block B5 has a depth value=2 (the sum of the depth value "1" when divided by the quad tree structure and the depth value "1" when divided by the multi-tree structure).

Furthermore, a block B6 is an example in which a region of 64*64 pixels is divided into regions of 64*32 pixels according to the binary tree structure. The block B6 has a depth value=2 (the sum of the depth value "1" when divided by the quad tree structure and the depth value "1" when divided by the multi-tree structure).

A block B7, a block B8, and a block B9 are examples of dividing a region of 64*32 pixels into a region of 64*8 pixels, regions of 64*16 pixels, and a region of 64*8 pixels, respectively, according to the ternary tree structure. In the block B7, the depth value=3 (the sum of the depth value "1" when divided by the quad tree structure and the depth value "2" when divided by the multi-tree structure). In the block B8, the depth value=3 (the sum of the depth value "1" when divided by the quad tree structure and the depth value "2" when divided by the multi-tree structure). In the block B9, the depth value=3 (the sum of the depth value "1" when divided by the quad tree structure and the depth value "2" when divided by the multi-tree structure).

On a block boundary Bv indicating a dividing position of blocks, blocks having different depth values are generally adjacent to left and right sides or upper and lower sides. Here, a division depth value Dv of the block boundary Bv representing a division state of respective blocks adjacent to the left and right or upper and lower sides of the block boundary Bv is defined as follows.

Figure 4:
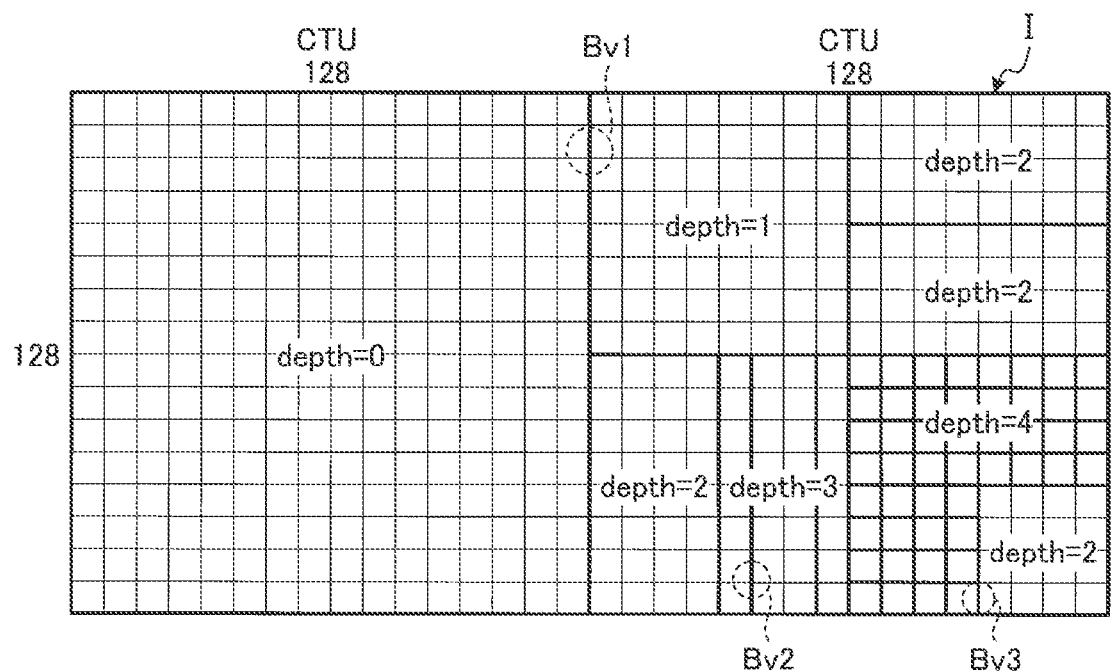
FIG. 4 is a diagram describing a method of calculating a division depth value.

FIG. 4 is a diagram describing a method of calculating the division depth value Dv. A method of determining the division depth value Dv will be described by taking block boundaries Bv1, Bv2, and Bv3 in an image I of FIG. 4 as an example. Note that FIG. 4 illustrates an example in which the image I is divided into blocks according to the quad tree structure from the CTU of 128*128 pixels. Furthermore, a smallest block in FIG. 4 indicates a block of 8*8 pixels.

In FIG. 4, the block boundary Bv1 is a boundary between a block on the left side with a depth value Da=0 and a block on the right side with a depth value Db=1. At this time, the smaller depth value Da=0 among the depth values of the respective blocks in contact with the block boundary Bv1 is set as the division depth value Dv at the block boundary Bv1.

Next, the block boundary Bv2 is a boundary between a block on the left side with the depth value Da=3 and a block on the right side with the depth value Db=3. At this time, the division depth value Dv of the block boundary Bv2 is three.

Furthermore, the block boundary Bv3 is a boundary between a block on the left side with the depth value Da=4 and a block on the right side with the depth value Db=2. At this time, the division depth value Dv of the block boundary Bv2 is two.

As described above, the depth values Da and Db are values defined for the blocks, whereas the division depth value Dv is a value defined for the block boundary Bv. The division depth value Dv is a value corresponding to the number of times of division of the respective blocks adjacent to the left and right or upper and lower sides of the block boundary Bv. In particular, in the example of the present embodiment, the division depth value Dv is a value corresponding to a block with a small number of times of division among the respective blocks adjacent to the left and right or upper and lower sides of the block boundary Bv.

1-4. Description of Filter Processing Unit

1-4-1. Description of Deblocking Filter

The deblocking filter provided in the image coding device 10 and an image decoding device 50 of the VVC method will be described. In the image coding device 10, each of the blocks as a processing unit is a rectangular block. Therefore, when optimum parameter determination, quantization, and the like are performed on each block, there is a possibility that a difference in image quality occurs between adjacent blocks on a finally decoded image. This difference in image quality becomes more significant when the compression rate of the image is high and there is more noise generated by coding. The noise generated in this manner is called block noise.

In order to reduce such block noise, the image coding device 10 includes a filter that performs smoothing on pixels at the block boundary inside an in-loop filter provided inside a loop that performs coding processing. This filter is referred to as a deblocking filter. The filter processing unit 22 of the image coding device 10 causes this deblocking filter to operate.

The deblocking filter performs smoothing processing on pixels near the boundary line along the block boundary. At that time, the deblocking filter first performs smoothing on a vertical boundary. Then, smoothing on a horizontal boundary is thereafter performed on the image in which the vertical boundary is smoothed.

1-4-2. Description of Strength Adjustment of Deblocking Filter

Figure 5:
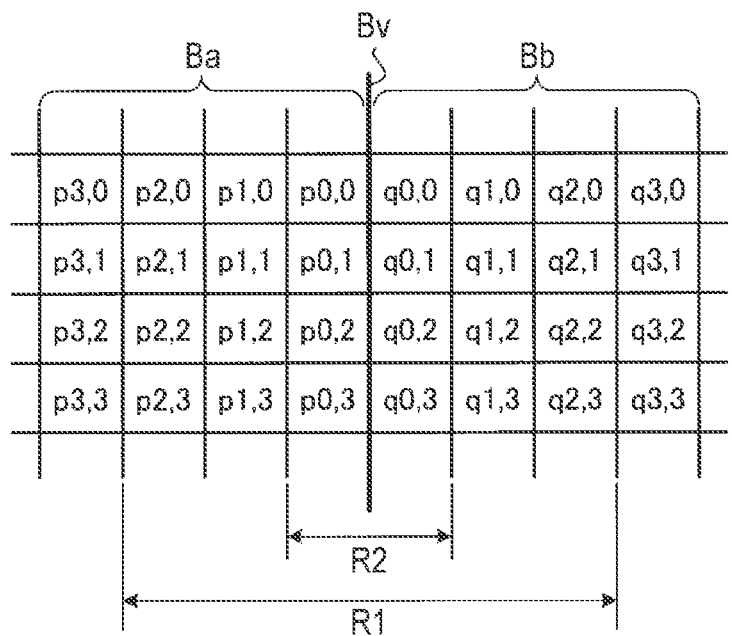
FIG. 5 is a diagram illustrating an example of arrays of pixels in two blocks adjacent to each other across a block boundary.
Figure 6:
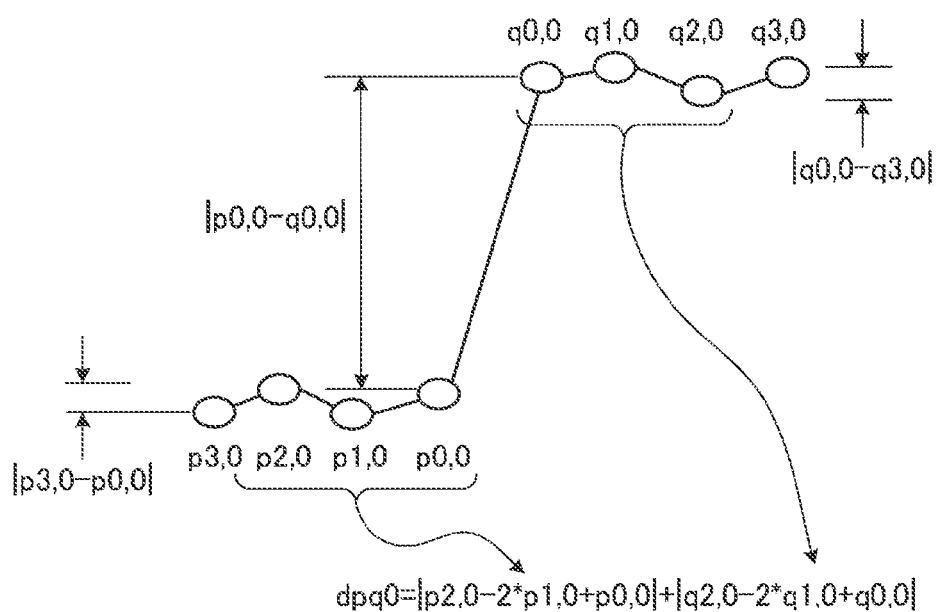
FIG. 6 is a diagram illustrating an example of a distribution of pixel values in the blocks of FIG. 5.

The filter processing unit 22 selects what kind of filtering is to be performed on the basis of the luminance distribution of the image. Specifically, the filter processing unit 22 sets whether or not to cause the deblocking filter to operate (presence or absence of the filter processing) and strength of the deblocking filter (filter strength). Hereinafter, these determination methods will be described using FIGS. 5 and 6. FIG. 5 is a diagram illustrating an example of arrays of pixels in two blocks adjacent to each other across a block boundary. FIG. 6 is a diagram illustrating an example of a distribution of pixel values in a part in the block of FIG. 5.

FIG. 5 illustrates an example of arrays of pixels in two adjacent blocks Ba and Bb with a block boundary BV interposed therebetween. In FIG. 6, image data (pixel values) stored in the block Ba is referred to as pi, j. i (=0, 1, 2, . . . ) is an index indicating the lateral position of a pixel, and j (=0, 1, 2, . . . ) is an index indicating the vertical position of a pixel. Furthermore, image data in the block Bb is referred to as qi, j. i (=0, 1, 2, . . . ) is an index indicating the lateral position of a pixel, and j (=0, 1, 2, . . . ) is an index indicating the vertical position of a pixel. That is, pixels corresponding to the block Ba on the left side across the block boundary Bv are denoted by adding a reference sign p. Furthermore, pixels corresponding to the block Bb on the right side across the block boundary Bv are denoted by adding a reference sign q. Note that the block boundary Bv may be set in a horizontal direction. In that case, the two blocks are vertically adjacent to each other. Then, the following description also applies to the block boundary Bv in the horizontal direction only by changing the arrangement of the blocks.

Note that the deblocking filter operates on the block boundary Bv of 8*8 pixels. The arrays of pixels illustrated in FIG. 5 indicate a part of a region on which the deblocking filter operates.

Hereinafter, a method of determining whether or not to cause the deblocking filter to operate on the block boundary Bv in FIG. 5 will be described.

FIG. 6 illustrates an example of a distribution of pixel values on a horizontal line corresponding to j=0 in the block of FIG. 5. First, the filter processing unit 22 calculates a flatness of the pixel values near an edge on the basis of the distribution of the pixel values. The flatness dpq0 of the pixel value on the horizontal line of j=0 is calculated by Equation (1).

[Equation 1]

$$dpq0=|p2,0-2*p1,0+p0,0|+|q2,0-2*q1,0+q0,0| \qquad (1)$$

Note that a first term of Equation (1) is represented by dp0, and a second term is represented by dq0. The flatness dpq0 calculated by Equation (1) becomes a smaller value as the distribution of the pixel values near the edge is flatter. That is, in a case where the flatness dpq0 satisfies the condition of Equation (2), it is determined that the distribution of the pixel values near the edge is flat.

[Equation 2]

$$dpq0=dp0+dq0<\beta \qquad (2)$$

Note that the range of pixels for which the distribution of pixel values is to be evaluated is based on Equation (1) regardless of the sizes of the block Ba and the block Bb. This is to maintain the efficiency of processing. Note that the threshold β will be described later in detail.

The filter processing unit 22 calculates flatnesses dpq0 and dpq3 for the uppermost horizontal line (j=0) and the lowermost horizontal line (j=3) of the block in FIG. 5, respectively. Then, in a case where both the flatnesses dpq0 and dpq3 are less than the threshold β, the filter processing unit 22 determines to cause the deblocking filter to operate on the block boundary Bv. That is, in a case where there is a region in which the distribution of the pixel values is flat across the block boundary Bv, if there is a gap of the pixel values at the block boundary Bv, the block noise becomes more noticeable, and thus the deblocking filter is caused to operate.

On the other hand, in a case where at least one of the flatnesses dpq0 and dpq3 exceeds the threshold β, the filter processing unit 22 determines that there is a region where the distribution of the pixel values is not flat across the block boundary Bv. Then, even in a case where there is a gap of the pixel values at the block boundary Bv, it is determined that the gap is a texture of the image, and it is determined to inhibit the deblocking filter from operating in order to preserve the texture. If it is determined to inhibit the deblocking filter from operating, a flag dE indicating the state of the deblocking filter to operate is set to zero.

Then, in a case where it is determined that the block boundary Bv is a block boundary to which the deblocking filter has to be applied, the filter processing unit 22 determines which one of a filter having high strength (strong) and a filter having low strength (weak) to operate according to the distribution of the pixel values. Note that the filter having high strength is a filter having a high smoothing effect. On the other hand, a filter having low strength is a filter having a low smoothing effect.

Next, a method of determining the filter strength to operate will be described. In a case where all of Equations (3), (4), and (5) are satisfied, the filter processing unit 22 determines to cause the strong filter to operate on the block boundary Bv in FIG. 5. If it is determined to cause the strong filter to operate, the flag dE described above is set to two. On the other hand, in a case where at least one of Equations (3), (4), or (5) is not satisfied, the filter processing unit 22 determines to cause the weak filter to operate on the block boundary Bv. If it is determined to cause the weak filter to operate, the flag dE described above is set to one.

[Equation 3]

$$dpq=dpq0+dpq3<(\beta>>2) \qquad (3)$$

[Equation 4]

$$|p3,0-p0,0|+|q,0,0-q3,0|<(\beta>>3) \qquad (4)$$

[Equation 5]

$$|p0,0-q0,0|<((5*tc+1)>>1) \qquad (5)$$

Equations (3) and (4) are equations for evaluating the flatness of the distribution of pixel values near the block boundary Bv. The value corresponding to the threshold β on the right side of Equations (3) and (4) is an example of a first predetermined value in the present disclosure.

Furthermore, Equation (5) is an equation for evaluating a gap between pixel values on the left and right sides of the block boundary Bv. A threshold tc in Equation (5) is a threshold used when the gap of the pixel values is evaluated. The right side of Equation (5), that is, the value corresponding to the threshold tc is an example of a second predetermined value in the present disclosure. The threshold tc will be described later in detail. Note that an operator (m>>n) in each equation is an operator for rightward shifting a numerical value m by n bits. Furthermore, specific examples of the strong filter and the weak filter will also be described later.

According to Equation (5), in a case where the gap between the pixel values is equal to or larger than the value evaluated on the basis of the threshold tc, the filter processing unit 22 determines that there is an edge (texture) originally included in the image, and causes the weak filter having a low effect of blurring the edge to operate.

1-4-3. Description of Method of Setting Threshold β and Threshold tc

Next, a method of setting the threshold β and the threshold tc described above will be described using FIG. 7. FIG. 7 is a diagram illustrating an example of a threshold setting table Tb1 for setting the threshold β and the threshold tc. As illustrated in FIG. 7, the values of the threshold β and the threshold tc are defined in the threshold setting table Tb1 in association with a quantization parameter Q. The threshold setting table Tb1 is what is called a look-up table (LUT), and refers to the threshold β and the threshold tc corresponding to the given quantization parameter Q by table lookup.

Note that a threshold β' and a threshold tc' illustrated in FIG. 7 are thresholds set for a case where the bit depth of the image is eight bits. In a case where the bit depth of the image is 10 bits or 12 bits, the threshold β' and the threshold tc' are corrected and used as described later. The threshold β' and the threshold tc' thus corrected are the threshold β and the threshold tc described above. Then, in a case where the bit depth of the image is eight bits, β=β' and tc=tc'.

As illustrated in FIG. 8, when the quantization parameter Q is large, that is, when the quantization level is coarse, the threshold β' is set to be large. This is because as the quantization parameter Q is larger, the threshold β' is set to be larger, so that the blocking filter is easy to operate.

Note that a quantization parameter QPP of the block Ba may be different from a quantization parameter QPQ of the block Bb adjacent to the block Ba. Thus, a qP value corresponding to the average quantization parameter of the two blocks is calculated by Equation (6).

[Equation 6]

$$qP=((Qp_Q+Qp_P+1)>>1)+qpOffset \quad (6)$$

Here, qpOffset is a value corresponding to the bit depth of the image. The quantization parameter Q is determined using Equation (7) on the basis of the qP value calculated by Equation (6).

[Equation 7]

$$Q=\text{Clip3}(0,63,qP+(\text{slice\_beta\_offset\_div2}<<1)) \quad (7)$$

Here, an operator (m<<n) is an operator for leftward shifting the numerical value m by n bits. Furthermore, a function clip3( ) of Equation (7) is defined by Equation (8).

[Equation 8]

$$\text{Clip3}(x, y, z) = \begin{cases} x; x > z \\ y; y < z \\ z; \text{otherwise} \end{cases} \quad (8)$$

In Equation (7), slice_beta_offset_div2 represents an offset value to be added to the quantization parameter Q when the threshold β (flatness near the block boundary Bv) is obtained. Then, slice_beta_offset_div2 is a parameter that can be adjusted by the user who uses the image coding device 10. That is, the user can adjust easiness of operation of the deblocking filter by setting the offset value slice_beta_offset_div2.

For example, it is assumed that the qP value calculated by Equation (6) is 30. At this time, β'=22 is set from FIG. 7. At this time, if the user sets the offset value slice_beta_offset_div2 to +5, the quantization parameter Q becomes 40 by Equation (7). Therefore, β'=42 is set from FIG. 7.

Note that, as described above, since the threshold β' illustrated in FIG. 7 is a value for an image having a bit depth of eight bits, it is necessary to correct the threshold β' according to the bit depth in a case of a 10-bit image or a 12-bit image. This correction is performed by Equation (9).

[Equation 9]

$$\beta=\beta'*(1<<(bD-8)) \quad (9)$$

In Equation (9), bD is a value indicating the bit depth of the image. For example, in a case of an 8-bit image, bD=8.

The quantization parameter Q is determined by applying the qP value calculated by Equation (6) to Equation (10).

[Equation 10]

$$Q=\text{Clip3}(0,65,qP+2*(bS-1)+(\text{slice\_tc\_offset\_div2}<<1)) \quad (1)$$

In Equation (10), slice_tc_offset_div2 represents an offset amount to be added to the quantization parameter Q when the threshold tc (the gap of the pixel value near the block boundary Bv) is obtained. Then, slice_tc_offset_div2 is a parameter that can be adjusted by the user who uses the image coding device 10. That is, the user can adjust the easiness for the deblocking filter to operate by setting the value of slice_tc_offset_div2.

Furthermore, in Equation (10), a boundary strength (bS) value is a value uniquely determined according to the states of the block Ba and the block Bb adjacent to the left and right or upper and lower sides with the block boundary Bv interposed therebetween. The bS value takes one of 0, 1, and 2. The bS value is two in a case where at least one of the blocks adjacent to the block boundary Bv is coded in the intra prediction mode. Furthermore, the bS value is one in a case where both blocks adjacent to the left and right or upper and lower sides of the block boundary Bv satisfy one of the following three conditions. A first condition is a case where at least one of both blocks includes a transformation coefficient that is not zero with respect to a prediction error, and the block boundary Bv is a boundary of a TU, and a second condition is a case where a difference between absolute values of components of motion vectors of both blocks is one pixel or more. A third condition is a case where motion compensation predictions of both blocks refer to different reference images, or the number of motion vectors is different between both blocks. Then, in a case where none of the above is applicable, the bS value is zero. Note that in a case where the bS value is zero, the deblocking filter is inhibited from operating on a luminance signal Y.

Then, in a case where the bS value is two, the quantization parameter Q is corrected to a larger value by Equation (10). That is, in the block coded in the intra prediction mode, the block noise tends to easily occur, and thus the deblocking filter is easy to operate.

On the basis of the value of the quantization parameter Q calculated by Equation (10), the corresponding threshold tc' is referred to from FIG. 8. Then, the threshold tc' is corrected according to the bit depth of the image by Equation (11).

[Equation 11]

$$t_C=t_C'*(1<<(bD-8)) \quad (11)$$

1-4-4. Description of Strong and Weak Filters

In a case where the flag dE is two, the filter processing unit 22 causes the following strong filter to operate.

[Equation 12]

$$p_{0,k}'=\text{Clip3}(p_{0,k}-2*t_C,p_{0,k}+2*t_C,(p_{2,k}+2*p_{1,k}+2*p_{0,k}+2*q_{0,k}+q_{1,k}+4)>>3) \quad (12)$$

[Equation 13]

$$p_{1,k}'=\text{Clip3}(p_{1,k}-2*t_C,p_{1,k}+2*t_C,(p_{2,k}+p_{1,k}\,p_{0,k}q_{0,k}+2)>>2) \quad (13)$$

[Equation 14]

$$p_{2,k}'=\text{Clip3}(p_{2,k}-2*t_C,p_{2,k}+2*t_C,(2*p_{3,k}+3*p_{2,k}+p_{1,k}p_{0,k}+q_{0,k}+4)>>3) \quad (14)$$

[Equation 15]

$$q_{0,k}'=\text{Clip3}(q_{0,k}-2*t_C,q_{0,k}+2*t_C,(p_{1,k}+2*p_{0,k}+2*q_{0,k}+2*q_{1,k}+q_{2,k}+4)>>3) \quad (15)$$

[Equation 16]

$$q_{1,k}'=\text{Clip3}(q_{1,k}-2*t_C,q_{1,k}+2*t_C,(p_{0,k}+q_{0,k}+q_{1,k}+q_{2,k}+2)>>2) \quad (16)$$

[Equation 17]

$$q_{2,k}'=\text{Clip3}(q_{2,k}-2*t_C, q_{2,k}+2*t_C, (p_{0,k}+q_{0,k}+q_{1,k}+3*q_{2,k}+2*q_{3,k}+4)>>3) \quad (17)$$

In Equations (12) to (17), pi, k and qi, k (i=0, 1, 2, 3 and k=0, 1, 2, 3) represent the respective pixel values illustrated in FIG. 6. As described in Equations (12) to (17), pi, k' and qi, k' after filter application are clipped within a range of pixel values ±2*tc before filter application.

A range in which the filters expressed by Equations (12) to (17) operate is the range of a region R1 illustrated in FIG. 6, that is, the range of three pixels on each of the left and right sides from the block boundary Bv. That is, the strong filter is a filter having a high smoothing effect that operates over a wide range near the block boundary Bv.

On the other hand, in a case where the flag dE is one, the filter processing unit 22 causes a weak filter described below to operate.

First, a change amount Δ is calculated by Equation (18).

[Equation 18]

$$\Delta = (9*(q_{0,k}-p_{0,k})-3*(q_{1,k}-p_{1,k})+8)>>4 \quad (18)$$

In a case where the change amount Δ calculated by Equation (18) satisfies Δ<tc*10, filtering by Equations (19) and (20) is performed. Note that the change amount Δ indicates a change amount of the pixel values near the block boundary Bv, and in a case where Δ≥tc*10, it is determined that the block boundary Bv is the position of the edge originally included in the image, and the deblock filter is inhibited from operating.

[Equation 19]

$$p_{0,k}'=p_{0,k}+\Delta \quad (19)$$

[Equation 20]

$$q_{0,k}'=q_{0,k}-\Delta \quad (20)$$

Note that in Equations (19) and (20), the change amount Δ is clipped within a range of ±tc.

Subsequently, the following processing is performed on the pixel pi, k and the pixel qi, k (k=0, 1, 2, and 3) only in a case where the filtering of Equations (19) and (20) is performed.

That is, in a case where Equation (21) is satisfied, it is determined that the flatness of the pixel value in the block Ba on the left side of the block boundary Bv is high, and Equations (22) and (23) are calculated.

[Equation 21]

$$dp<(\beta+(\beta>>1))>>3 \quad (21)$$

[Equation 22]

$$\Delta p=\text{Clip3}(-(t_C>>1), t_C>>1, (((p_{2,k}+p_{0,k}+1)>>1)-p_{1,k}+\Delta)>>1) \quad (22)$$

[Equation 23]

$$p_{1,k}'=p_{1,k}+\Delta p \quad (23)$$

On the other hand, in a case where Equation (24) is satisfied, it is determined that the flatness of the pixel value in the block Bb on the right side of the block boundary Bv is high, and Equations (25) and (26) are calculated.

[Equation 24]

$$dq<(\beta+(\beta>>1))>>3 \quad (24)$$

[Equation 25]

$$\Delta q=\text{Clip3}(-(t_C>>1), t_C>>1, (((q_{2,k}+q_{0,k}+1)>>1)-q_{1,k}-\Delta)>>1) \quad (25)$$

[Equation 26]

$$q_{1,k}'=q_{1,k}+\Delta q \quad (26)$$

Note that Δp and Δq are clipped to ±(tc>>1). Moreover, p0, k', q0, k', p1, k', q1, k' after the filtering processing are clipped in a range of a possible maximum value and minimum value of the luminance signal Y. Furthermore, depending on the values of dp and dq, there may be a case where only Equations (22) and (23) are executed, or there may be a case where only Equations (25) and (26) are executed. That is, there may be a case where the weak filter is applied only to the left side or only to the right side of the block boundary Bv.

A range in which the filters described in Equations (19) to (26) operate is the range of a region R2 illustrated in FIG. 6, that is, the range of one pixel on each of the left and right sides from the block boundary Bv. That is, the weak filter is a filter having a low smoothing effect operating on a narrow range near the block boundary Bv.

Note that after performing the filtering processing on the vertical boundary of the image, the filter processing units 22 and 56 perform the filtering processing on the horizontal boundary on a filtering result on the vertical boundary. A filtering method for the horizontal boundary differs only in the direction in which the filter is to operate, and determination processing and calculation processing are similar to those of the filtering processing for the vertical boundary, and thus the description thereof will be omitted.

1-4-5. Description of Filtering Method for Color Difference Signal

An image to be coded generally has the luminance signal Y and a color difference signal C. The filtering method described above describes the filtering processing on the luminance signal Y. The following filtering is performed on the color difference signal C.

In the VVC method, the luminance signal Y and the color difference signal C can be divided into blocks independently of each other (common block division is performed in the HEVC). Therefore, it is necessary to set the threshold tc for the color difference signal C in a similar procedure to that described above. Note that the threshold β described above is not used for the color difference signal C.

Figure 9:
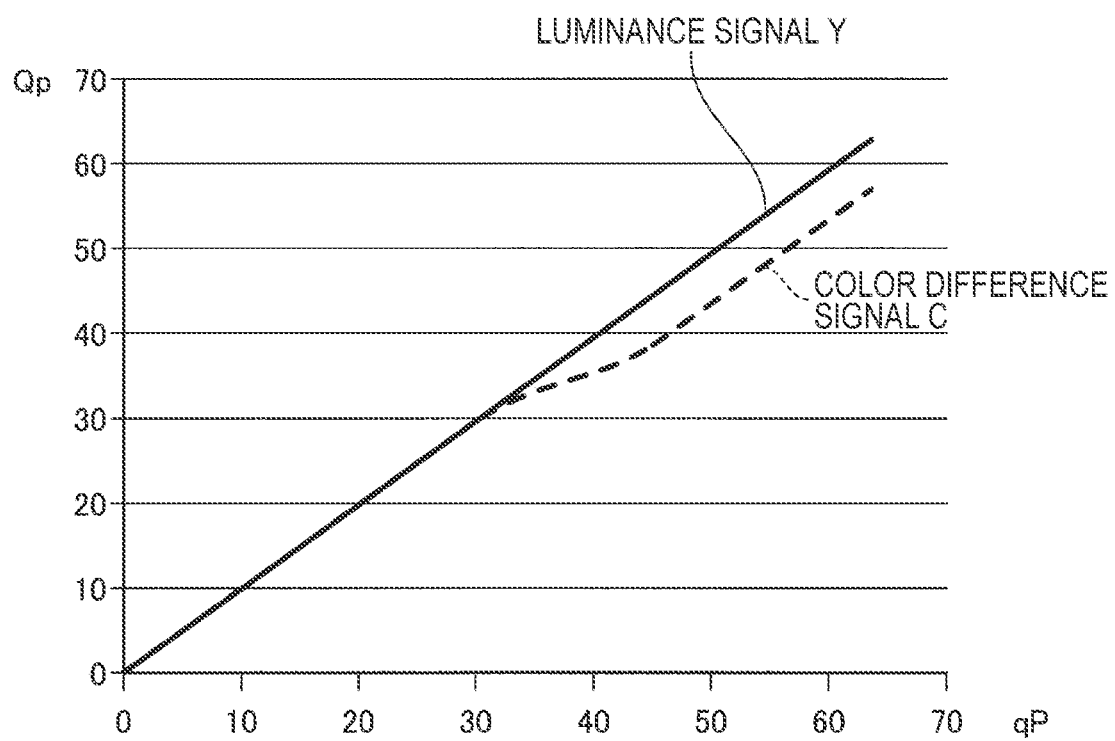
FIG. 9 is a graph of the correction table of FIG. 8.

When the threshold tc is set for the color difference signal C, the threshold setting table Tb1 illustrated in FIG. 7 is used, but before that, the qP value is corrected to QPC using a correction table Tb2 of FIG. 8. FIG. 9 is an example of the correction table Tb2 of the qP value set when filtering the color difference signal C. Furthermore, FIG. 9 is a graph of the correction table Tb2 of FIG. 8. As illustrated in FIG. 8, the correction is performed to the minus side in a region where the qP value is large. Thus, in the region where the qP value is large, correction is performed in a direction in which strength of the filter becomes weak.

Note that the deblocking filter is caused to operate on the color difference signal C only in a case where the bS value described above is two. Furthermore, the deblocking filter to operate on the color difference signal C is only the weak filter.

When filtering is performed on the color difference signal C, first, the qP value corresponding to an average quantization parameter of two adjacent blocks is calculated by Equation (27).

[Equation 27]

$$qPi=((Qp_Q+Qp_P+1)>>1)+cQp\text{PicOffset} \quad (27)$$

cQpPicOffset in Equation (27) is a value corresponding to whether the processing target is a blue color difference Cb or a red color difference Cr in the color difference signal C, or the like. On the basis of the qP value calculated by Equation (27), the quantization parameter Q is determined using Equation (28).

[Equation 28]

$$Q=\text{Clip3}(0,65,Qp_C+2+(\text{slice\_tc\_offset\_div2}<<1)) \quad (28)$$

QPC in Equation (28) is a value obtained by correcting the qP value in FIG. 9. Furthermore, slice_tc_offset_div2 in Equation (28) is as described above. The user can adjust the easiness for the deblocking filter to operate by setting a value of slice_tc_offset_div2.

The corresponding threshold tc' is set from FIG. 8 (FIG. 9) on the basis of the value of the quantization parameter Q calculated by Equation (28). Then, the threshold tc' is corrected to the threshold tc according to the bit depth of the image by Equation (11).

Then, the filter processing unit 22 causes a weak filter described below to operate. First, the change amount Δ is calculated by Equation (29).

[Equation 29]

$$\Delta=(((q_{0,k}-p_{0,k})<<2)+p_{1,k}-q_{1,k}+4)>>3 \quad (29)$$

Note that in Equation (29), the change amount Δ is clipped within the range of ±tc. Then, filtering is performed by applying the calculated change amount Δ to Equations (19) and (20) described above. Note that the pixels p0, k and q0, k after the filtering processing are clipped in the range between a maximum value and a minimum value that can be taken by the color difference signal C.

Figure 10:
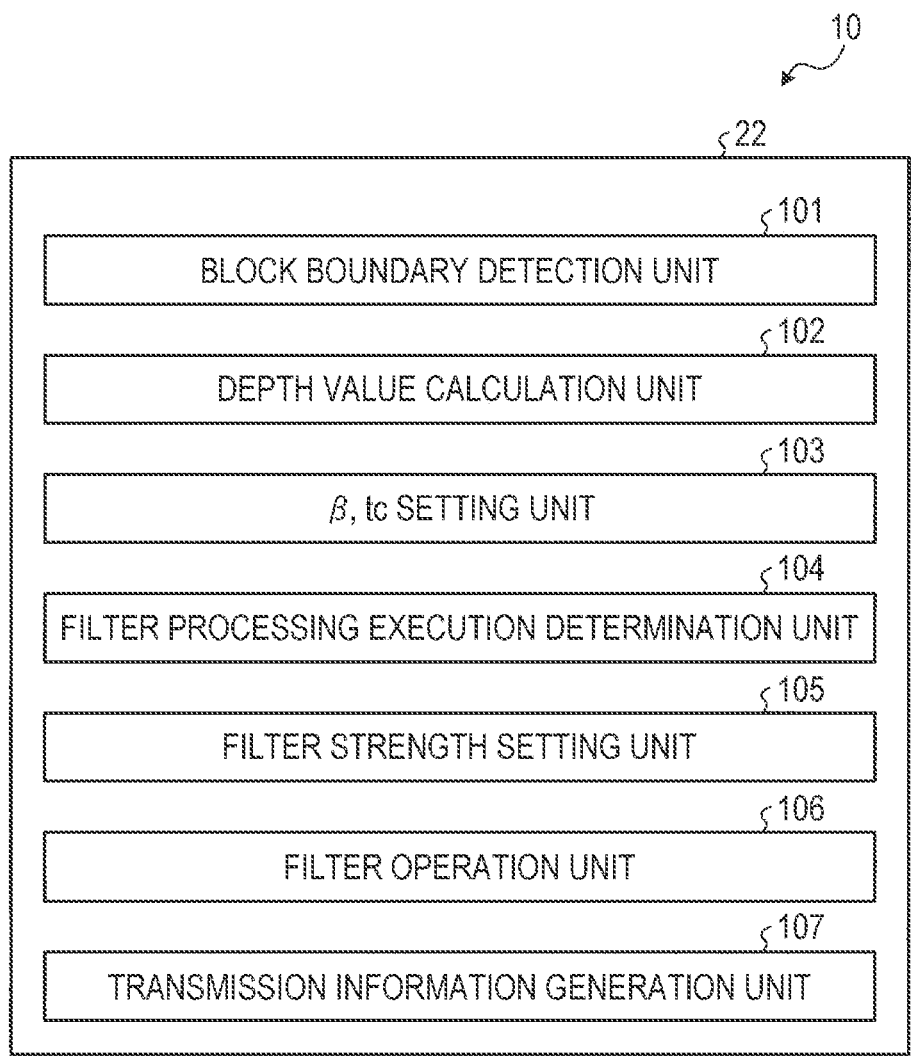
FIG. 10 is a functional block diagram illustrating an example of a functional configuration of a filter processing unit in the image coding device of the first embodiment.

1-5. Description of Functional Configuration of Filter Processing Unit of First Embodiment FIG. 10 is a functional block diagram illustrating an example of a functional configuration of the filter processing unit 22 in the image coding device 10 of the first embodiment. The filter processing unit 22 includes a block boundary detection unit 101, a depth value calculation unit 102, a β, tc setting unit 103, a filter processing execution determination unit 104, a filter strength setting unit 105, a filter operation unit 106, and a transmission information generation unit 107.

The block boundary detection unit 101 detects the block boundary Bv in the image on which the deblocking filter operates, that is, the block boundary Bv having a size of 8*8 pixels or more. The block boundary detection unit 101 detects the block boundary Bv, for example, by receiving information indicating the position of the block boundary as a coding parameter from a block division unit (not illustrated in FIG. 1).

The depth value calculation unit 102 calculates the depth values Da and Db for determining presence or absence of the processing of the deblocking filter and strength of the deblocking filter for the image divided into a plurality of blocks according to a division state of each block adjacent to the block boundary Bv. Specifically, the depth value calculation unit 102 calculates the depth values Da and Db according to the number of times of division (division state) of each block adjacent to the block boundary Bv. Note that the depth value calculation unit 102 sets a sum of the number of times of division according to each n-branch tree structure when an image is divided into blocks on the basis of the n-branch tree structure (n=2, 3, and 4) as the number of times of division of each block. Then, the depth values Da and Db of respective blocks are calculated on the basis of the number of times of division. Then, the depth value calculation unit 102 sets, as the division depth value Dv of the block boundary Bv, the depth value of a block having a smaller number of times of division out of the depth values Da and Db of two blocks adjacent to the left and right sides on the block boundary Bv of the image. That is, Dv=min (Da, Db). Furthermore, the depth value calculation unit 102 sets, as the division depth value Dv of the block boundary Bv, the depth value of a block having a smaller number of times of division out of the depth values Da and Db of two blocks adjacent to the upper and lower sides on the block boundary Bv of the image.

Figure 11:
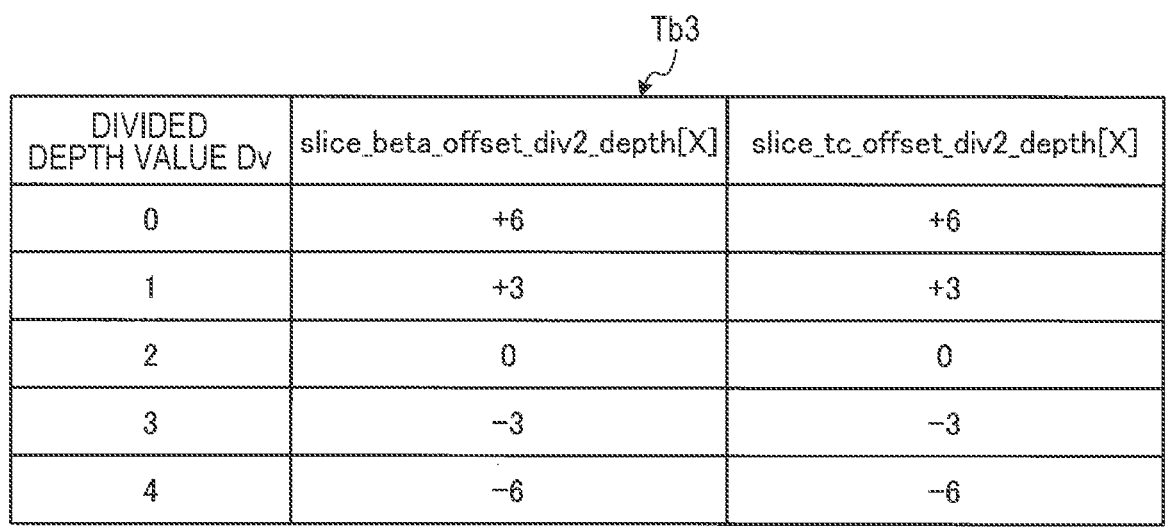
FIG. 11 is a diagram illustrating an example of a threshold correction table of the threshold β and the threshold tc according to the division depth value.

The β, tc setting unit 103 sets offset values of the threshold β and the threshold tc according to the division depth value Dv of the block boundary by referring to a threshold correction table Tb3 of FIG. 11. Then, the β, tc setting unit 103 sets the threshold β and the threshold tc by referring to the threshold setting table Tb1 of FIG. 7 on the basis of the quantization parameters Q of the two blocks adjacent to the block boundary Bv and the offset values of the threshold β and the threshold tc.

FIG. 11 is a diagram illustrating an example of the threshold correction table Tb3 of the threshold β and the threshold tc according to the division depth value. The threshold correction table Tb3 stores an offset value slice_beta_offset_div2_depth[X] of the threshold β according to the division depth value Dv and an offset value slice_tc_offset_div2_depth[X] of the threshold tc. Note that the offset value of the threshold β and the offset value of the threshold tc are set to be smaller as the division depth value Dv is larger. This is because the filter strength is set to be weaker as the division depth value Dv is smaller, that is, as the block in contact with the block boundary Bv is smaller. Note that, in FIG. 11, offset values of +6, +3, 0, −3, and −6 are registered according to the division depth value, but the offset values are not limited to these values and may be freely set. Furthermore, equal offset values are registered between the threshold β and the threshold tc, but they may be different offset values.

Then, for example, since the division depth value Dv is zero for the block boundary Bv1 in FIG. 4, the β, tc setting unit 103 refers to the field of Dv=3 in the threshold correction table Tb3 and acquires the offset value +6 of the threshold β and the offset +6 of the threshold tc.

Further, since the block boundary Bv2 in FIG. 4 has the division depth value Dv=3, the β, tc setting unit 103 acquires the offset value −3 of the threshold β and the offset −3 of the threshold tc. Furthermore, since the block boundary Bv3 in FIG. 4 has the division depth value Dv=2, the β, tc setting unit 103 acquires the offset value 0 of the threshold β and the offset value 0 of the threshold tc.

The filter processing execution determination unit 104 determines whether or not to cause the deblocking filter to operate on the block boundary Bv on the basis of the depth values Da and Db (division depth value Dv). Specifically, the filter processing execution determination unit 104 determines whether or not to cause the deblocking filter to operate on the block boundary Bv on the basis of whether the target of the deblocking filter is the luminance signal Y or the color difference signal C and of the bS value of the block boundary Bv. Furthermore, the filter processing execution determination unit 104 determines whether or not to cause the deblocking filter to operate on the block boundary Bv on the basis of the division depth value Dv of the block boundary Bv, the distribution state (flatness) of the pixel values near the block boundary Bv, and the quantization parameters Q of respective blocks adjacent to the left and right or upper and lower sides of the block boundary Bv. Moreover, the filter processing execution determination unit 104 determines whether the processing target is the luminance signal Y or the color difference signal C from coding information related to the block of interest. Furthermore, the filter processing execution determination unit 104 calculates the bS value of the block boundary Bv on the basis of the coding information related to the block of interest.

Specifically, the filter processing execution determination unit 104 determines that the deblocking filter is easier to operate on the block boundary Bv as the division depth value Dv of the block boundary Bv is smaller. Furthermore, the filter processing execution determination unit 104 determines that the deblocking filter is more difficult to operate on the block boundary Bv as the division depth value Dv of the block boundary Bv is larger. Note that in order to determine that the deblocking filter is easy to operate, it is only required to set the threshold β described above to be loose, so that the deblocking filter is easy to operate even if the distribution of the pixel values near the block boundary Bv is not flat. On the other hand, in order to determine that the deblocking filter is difficult to operate, it is only required to set the threshold β to be strict, so that the deblocking filter is difficult to operate unless the distribution of the pixel values near the block boundary Bv is flat.

Furthermore, in a case where the target of the deblocking filter is the luminance signal Y and the bS value is zero, the filter processing execution determination unit 104 determines to inhibit the deblocking filter from operating. Moreover, in a case where the target of the deblocking filter is the color difference signal C and the bS value is not two, the filter processing execution determination unit 104 determines to inhibit the deblocking filter from operating. Note that the color difference signal C will be described in detail in a fifth embodiment as described later.

The filter strength setting unit 105 sets the strength of the deblocking filter to operate on the block boundary Bv on the basis of the depth values Da and Db (division depth value Dv). Specifically, the filter strength setting unit 105 sets the strength of the deblocking filter to operate on the block boundary Bv on the basis of the division depth value Dv of the block boundary Bv, the quantization parameters Q of the respective blocks adjacent to the left and right or upper and lower sides of the block boundary Bv, and the distribution state (flatness and gap) of the pixel values near the block boundary Bv. That is, the filter strength setting unit 105 adaptively sets the strength of the deblocking filter to operate according to the division depth value Dv of the block boundary Bv. More specifically, the strong filter is caused to operate on the block boundary Bv having a small division depth value Dv (block boundary Bv of a large block). Furthermore, the weak filter is caused to operate on the block boundary Bv having a large division depth value Dv (block boundary Bv of a small block).

Specifically, the filter strength setting unit 105 sets the strength of the deblocking filter to be strong in a case where the flatness of the distribution of the pixel values near the block boundary Bv is high and the gap between the pixel values of the pixels sandwiching the block boundary Bv is small. More specifically, the filter strength setting unit 105 determines whether or not the flatness of the distribution of the pixel values near the block boundary Bv is higher than a value (first predetermined value) corresponding to the threshold β on the basis of Equations (3) and (4). Furthermore, the filter strength setting unit 105 determines whether or not the gap between the pixel values of the pixels sandwiching the block boundary Bv is smaller than a value (second predetermined value) corresponding to the threshold tc on the basis of Equation (5).

The filter operation unit 106 causes the deblocking filter having the strength set by the filter strength setting unit 105 to operate on the block boundary Bv of the image.

The transmission information generation unit 107 stores a determination result of the filter processing execution determination unit 104 and a setting threshold set by the filter strength setting unit 105, that is, information related to the deblocking filter, in a picture parameter set (PPS) or a slice header described in the header of the coded bit stream.

1-6. Description of Method for Transmitting Setting Information Related to Deblocking Filter Hereinafter, a specific description method will be described with an example in which the transmission information generation unit 107 transmits information related to the deblocking filter by the slice header.

The transmission information generation unit 107 stores, as information related to the deblocking filter, a flag for switching presence or absence of the processing of the deblocking filter, and the threshold β and the threshold tc, which are setting thresholds of the strength of the deblocking filter for each depth value, in the header of the coded bit stream. Note that the threshold β and the threshold tc are expressed by offsets as illustrated in FIG. 12B.

The flag for switching presence or absence of the processing of the deblocking filter is transmitted as a parameter slice_deblocking_filter_delta_enable_flag. When the flag is one, the flag indicates that the deblocking filter is caused to operate. On the other hand, when it is zero, the flag indicates that the conventional filter processing, that is, the deblocking filter that does not depend on the division depth value Dv is allowed to operate.

The transmission information generation unit 107, with the offset value slice_beta_offset_div2 and the offset value slice_tc_offset_div2 being respective predetermined reference values, transmits the threshold β and the threshold tc for respective depths as difference values from the reference values. That is, the offset value of the threshold β is transmitted by slice_beta_offset_div2_delta[X] (X=0, 1, 2, 3, ...). Furthermore, the offset value of the threshold tc is transmitted by slice_tc_offset_div2_delta[X] (X=0, 1, 2, 3, ...).

Note that the maximum values of the difference values to be transmitted are specified by the parameter diff_deblocking_filter_delta_depth.

Then, the offsets of the threshold β and the threshold tc at depth[X] are calculated by Equations (30) and (31), respectively.

[Equation 30]

$$\text{slice\_beta\_offset\_div2\_depth}[X] = \text{clip3}(-6, 6, \text{slice\_beta\_offset\_div2} + \text{slice\_beta\_offset\_div2\_delta}[X])$$

[Equation 31]

$$\text{slice\_tc\_offset\_div2\_depth}[X] = \text{clip3}(-6, 6,$$
$$\text{slice\_tc\_offset\_div2} + \text{slice\_tc\_offset\_div2delta}[X]) \qquad (31)$$

Note that Equations (30) and (31) are based on the threshold correction table Tb3, and values are clipped at ±6. Further, in a case where slice_beta_offset_div2_delta[X] is not transmitted, zero is set. Furthermore, in a case where slice_tc_offset_div2_delta[X] is not transmitted, zero is set.

Then, on the luminance signal Y, the quantization parameters Q used to calculate the threshold β and the threshold tc are calculated by the above-described Equations (7) and (10), respectively. Furthermore, in the color difference signal C, the quantization parameter Q used for calculation of the threshold tc is calculated by above-described Equation (28).

FIG. 12A is a diagram illustrating an example of a slice header 201 storing setting information related to the deblocking filter. Furthermore, FIG. 12B is a diagram illustrating an example of a picture parameter set 202 storing setting information related to the deblocking filter.

As illustrated in FIG. 12A, the slice header 201 transmits the offset of the threshold β and the offset of the threshold tc while changing the variable i from zero to the value indicated by the parameter diff_deblocking_filter_delta_depth. As illustrated in FIG. 12B, the same applies to a case of transmission using the picture parameter set 202.

1-7. Description of Operation of Filter Processing Unit

Next, a flow of processing performed by the filter processing unit 22 will be described using FIG. 13. FIG. 13 is a flowchart illustrating an example of a flow of processing performed by the filter processing unit 22 according to the first embodiment. The processing illustrated in this flowchart describes the processing performed in step S19 of FIG. 2 in detail. Note that FIG. 13 illustrates a flow of processing for the block boundary Bv in the vertical direction.

The block boundary detection unit 101 determines whether it is a block boundary of 8*8 pixels which is a unit in which the deblocking filter operates (step S51). If it is determined to be the block boundary of 8*8 pixels (step S51: Yes), the processing proceeds to step S52. On the other hand, if it is not determined to be the block boundary of 8*8 pixels (step S51: No), the processing proceeds to step S64.

Subsequently, the block boundary detection unit 101 determines whether it is a boundary of blocks (step S52). If it is determined to be the boundary of blocks (step S52: Yes), the processing proceeds to step S53. On the other hand, if it is not determined to be the boundary of blocks (step S52: No), the processing proceeds to step S64.

Next, the depth value calculation unit 102a acquires the depth value Da of the block Ba on the left side of the block boundary Bv (step S53).

Moreover, the depth value calculation unit 102a acquires the depth value Db of the block Bb on the right side of the block boundary Bv (step S54).

Then, the depth value calculation unit 102a calculates the division depth value Dv of the block boundary Bv on the basis of the depth value Da and the depth value Db of the blocks adjacent to the left and right sides of the block boundary Bv (step S55).

Next, the β, tc setting unit 103 sets the threshold β and the threshold tc (step S56). The β, tc setting unit 103 sets the threshold β to a value corresponding to the division depth value Dv. Specifically, the threshold β is set to be stricter as the division depth value Dv is smaller, and the threshold β is set to be looser as the division depth value Dv is smaller. Note that as the threshold β is set to a larger value, the determination criterion of the flatness is looser.

The filter processing execution determination unit 104 determines whether the bS value of the block boundary Bv is one or more (step S57). If it is determined that the bS value of the block boundary Bv is one or more (step S57: Yes), the processing proceeds to step S58. On the other hand, if it is not determined that the bS value of the block boundary Bv is one or more (step S57: No), the processing proceeds to step S64.

Moreover, the filter processing execution determination unit 104 determines whether the distribution of the pixel values near the block boundary Bv is flat (step S58). If it is determined that the distribution of the pixel values is flat (step S58: Yes), the processing proceeds to step S59. On the other hand, if it is not determined that the distribution of the pixel values is flat (step S58: No), the processing proceeds to step S64. Note that whether the distribution of the pixel values is flat is determined by Equation (2).

Next, the filter strength setting unit 105 determines whether to cause the strong filter to operate on the block boundary Bv (step S59). If it is determined to cause the strong filter to operate (step S59: Yes), the processing proceeds to step S65. On the other hand, if it is not determined to cause the strong filter to operate (step S59: No), the processing proceeds to step S60. Note that whether to cause the strong filter to operate is determined by Equations (3), (4), and (5).

If it is determined as No in step S59, the filter strength setting unit 105 determines whether the block boundary Bv is an edge of the image (step S60). If it is determined that the block boundary Bv is an edge of the image (step S60: Yes), the processing proceeds to step S64. On the other hand, if it is not determined that the block boundary Bv is an edge of the image (step S60: No), the processing proceeds to step S61. Note that the filter strength setting unit 105 determines that the block boundary Bv is an edge of the image when the change amount Δ calculated by Equation (18) satisfies Δ≥tc*10.

If it is determined as No in step S60, the filter strength setting unit 105 determines whether the distribution of the pixel values near the block boundary Bv is flat on both the left and right sides (step S61). If it is determined that the pixel value distribution is flat on both the left and right sides (step S61: Yes), the processing proceeds to step S62. On the other hand, if it is not determined that the pixel value distribution is flat on both the left and right sides (step S61: No), the processing proceeds to step S63. Note that whether the distribution of the pixel values near the left side of the block boundary Bv is flat is determined by Equation (21). Furthermore, whether the distribution of the pixel values near the right side of the block boundary Bv is flat is determined by Equation (24).

If Yes is determined in step S61, the filter strength setting unit 105 sets the weak filter to operate on the left and right of the block boundary Bv (step S62). Specifically, filters based on Equations (22), (23), (25), and (26) are set. Thereafter, the processing proceeds to step S65.

On the other hand, if it is determined as No in step S61, the filter strength setting unit 105 sets a weak filter to operate only on the left side or the right side of the block boundary Bv (step S63). Specifically, the filter that operates only on the left side of the block boundary Bv is set by Equations

(22) and (23). Furthermore, the filter to operate only on the right side of the block boundary Bv is set by Equations (25) and (26).

In a case where No is determined in steps S52, S52, S57, and S58, and in a case where Yes is determined in step S60, the filter processing execution determination unit 104 determines to inhibit the deblocking filter from operating on the block boundary Bv (step S64). Thereafter, the processing proceeds to step S67.

Furthermore, in a case where Yes is determined in step S59, and subsequent to steps S62 and S63, the filter operation unit 106 causes the set deblocking filter to operate on the block boundary Bv (step S65).

Subsequently, the transmission information generation unit 107 generates information related to the deblocking filter and stores the information in the picture parameter set or the slice header (step S66).

The block boundary detection unit 101 determines whether the entire image has been processed (step S67). If it is determined that the entire image has been processed (step S67: Yes), the processing of FIG. 13 ends. On the other hand, if it is not determined that the entire image has been processed (step S67: No), the processing returns to step S51 and the above-described processing is repeated.

Note that in a case where the deblocking filter is caused to operate on the boundary of the blocks in the horizontal direction, it is only required to perform the same calculation and determination as those described in FIG. 13 on the blocks adjacent to the upper and lower sides of the boundary of the blocks.

1-8. Effects of First Embodiment

As described above, in the image coding device 10 of the first embodiment, the depth value calculation unit 102 calculates the depth values Da and Db for determining presence or absence of the processing of the deblocking filter and the strength of the deblocking filter according to the division states of respective blocks adjacent to the block boundary Bv for the image divided into a plurality of blocks. The filter processing execution determination unit 104 determines whether or not to cause the deblocking filter to operate on the block boundary Bv on the basis of the division depth value Dv calculated from the depth values Da and Db, the distribution state of the pixel values near the block boundary Bv, and the quantization parameters Q of respective blocks adjacent to the left and right (or upper and lower) sides of the block boundary Bv. Furthermore, the filter strength setting unit 105 sets the strength of the deblocking filter to operate on the block boundary Bv according to the division depth value Dv, the quantization parameters Q of respective blocks adjacent to the left and right (or upper and lower) sides of the block boundary Bv, and the distribution state of the pixel values near the block boundary Bv.

Thus, the image coding device 10 adaptively sets the strength of the deblocking filter to operate according to the division depth value Dv of the block boundary Bv, and thus it becomes easy for the strong filter to operate on a large block having a small number of times of division. Furthermore, it becomes easy for the weak filter to operate on a small block having a large number of times of division. Thus, the block noise can be reduced while maintaining the texture of the original image.

Furthermore, in the image coding device 10 of the first embodiment, the depth value calculation unit 102 calculates the division depth value Dv of the block boundary Bv according to the number of times of division of each block adjacent to the left and right (or upper and lower) sides of the block.

Thus, the image coding device 10 can easily calculate the division depth value according to the division state of each block adjacent to the left and right (or upper and lower) sides of the block boundary Bv.

Furthermore, in the image coding device 10 of the first embodiment, the depth value calculation unit 102 sets, as the division depth value Dv of the block boundary Bv, a value corresponding to the number of times of division of a block having a smaller number of times of division out of the numbers of divisions of the left and right (or upper and lower) blocks of the block boundary Bv.

Thus, the image coding device 10 can set the filter strength on the basis of a larger block having a smaller number of times of division among the adjacent blocks. Thus, the deblocking filter according to the state of the image can be set.

Furthermore, in the image coding device 10 of the first embodiment, the depth value calculation unit 102 sets the sum of the number of times of division according to each tree branch structure when an image is divided into blocks according to the n-branch tree structure (n=2, 3, and 4) as the number of times of division of the blocks.

Thus, the image coding device 10 can easily calculate the depth value regardless of the block division method.

Furthermore, in the image coding device 10 of the first embodiment, the filter processing execution determination unit 104 determines that the deblocking filter is easier to operate on the block boundary Bv as the division depth value Dv of the block boundary Bv is smaller, and determines that the deblocking filter is more difficult to operate on the block boundary Bv as the division depth value Dv of the block boundary Bv is larger.

Thus, in the image coding device 10, it becomes difficult for the deblocking filter to operate on the region where the division depth value Dv of the block boundary Bv is small, that is, the region where the image is likely to have the texture, and thus the texture of the image can be preserved.

Furthermore, in the image coding device 10 of the first embodiment, the filter processing execution determination unit 104 loosely sets the threshold β of determining the flatness of the distribution of the pixel values near the block boundary Bv as the division depth value Dv of the block boundary Bv is smaller, and strictly sets the threshold β of determining the flatness of the distribution of the pixel values near the block boundary Bv as the division depth value Dv of the block boundary Bv is larger.

Thus, the image coding device 10 can easily change the threshold for determining whether or not to cause the deblocking filter to operate according to the state of the image.

Furthermore, in the image coding device 10 of the first embodiment, the filter strength setting unit 105 sets the strength of the deblocking filter to be stronger as the division depth value Dv of the block boundary Bv is smaller. Furthermore, the filter strength setting unit 105 sets the strength of the deblocking filter to be weaker as the division depth value Dv of the block boundary Bv is larger.

Thus, in the image coding device 10, it becomes easy for the strong filter to operate on the large block. Furthermore, it becomes easy for the weak filter to operate on the small block. Accordingly, the block noise can be reduced.

Furthermore, in the image coding device 10 of the first embodiment, the filter strength setting unit 105 sets the strength of the deblocking filter to be strong in a case where the flatness of the distribution of the pixel values near the block boundary Bv is higher than the value (first predetermined value) corresponding to the threshold β and the gap between the pixel values of the pixels sandwiching the block boundary Bv is smaller than the value (second predetermined value) corresponding to the threshold tc.

Thus, the image coding device 10 can cause an appropriate filter to operate according to the distribution of the pixel values.

Furthermore, in the image coding device 10 of the first embodiment, the transmission information generation unit 107 stores the determination result of the filter processing execution determination unit 104 and the threshold β and the threshold tc (setting threshold) set by the filter strength setting unit 105 in the coded bit stream.

Thus, the image coding device 10 can efficiently transmit the information related to the deblocking filter to, for example, the image decoding device that decodes the coded image.

Furthermore, in the image coding device 10 of the first embodiment, the transmission information generation unit 107 stores a flag (slice_deblocking_filter_delta_enable_flag) for switching presence or absence of the processing of the deblocking filter at each block boundary Bv, and the threshold R and the threshold tc (setting threshold) for each depth value in the coded bit stream.

Thus, the image coding device 10 can efficiently transmit information related to the deblocking filter.

Furthermore, in the image coding device 10 of the first embodiment, the transmission information generation unit 107 stores the threshold β and the threshold tc (setting threshold) for each depth value in the coded bit stream as the difference values from the offset values (slice_beta_offset_div2, slice_tc_offset_div2) which are the predetermined reference values.

Thus, the image coding device 10 can transmit the information related to the deblocking filter with a smaller amount of data.

2. Second Embodiment

Hereinafter, a second embodiment of the present disclosure will be described. A second embodiment of the present disclosure is an example of the image decoding device 50 that generates a decoded image by decoding the coded bit stream generated by the image coding device 10 described above. Note that the image decoding device 50 is an example of an information processing device in the present disclosure.

When the coded image is decoded, the deblocking filter processing similar to that described in the first embodiment is also performed. At this time, it has been possible that the block noise occurs in a coarse block (large block). Thus, in the coarse block, in order to suppress occurrence of the block noise, it is desirable to set the deblocking filter to easily operate and allow the strong filter to operate. However, if the strong filter operates on a fine block, texture of an image is lost, and image quality may be deteriorated. Therefore, when the image is decoded, it has not been possible to cause the deblocking filter to operate according to the state of block division of the coded image.

2-1. Configuration of Image Decoding Device

Figure 14:
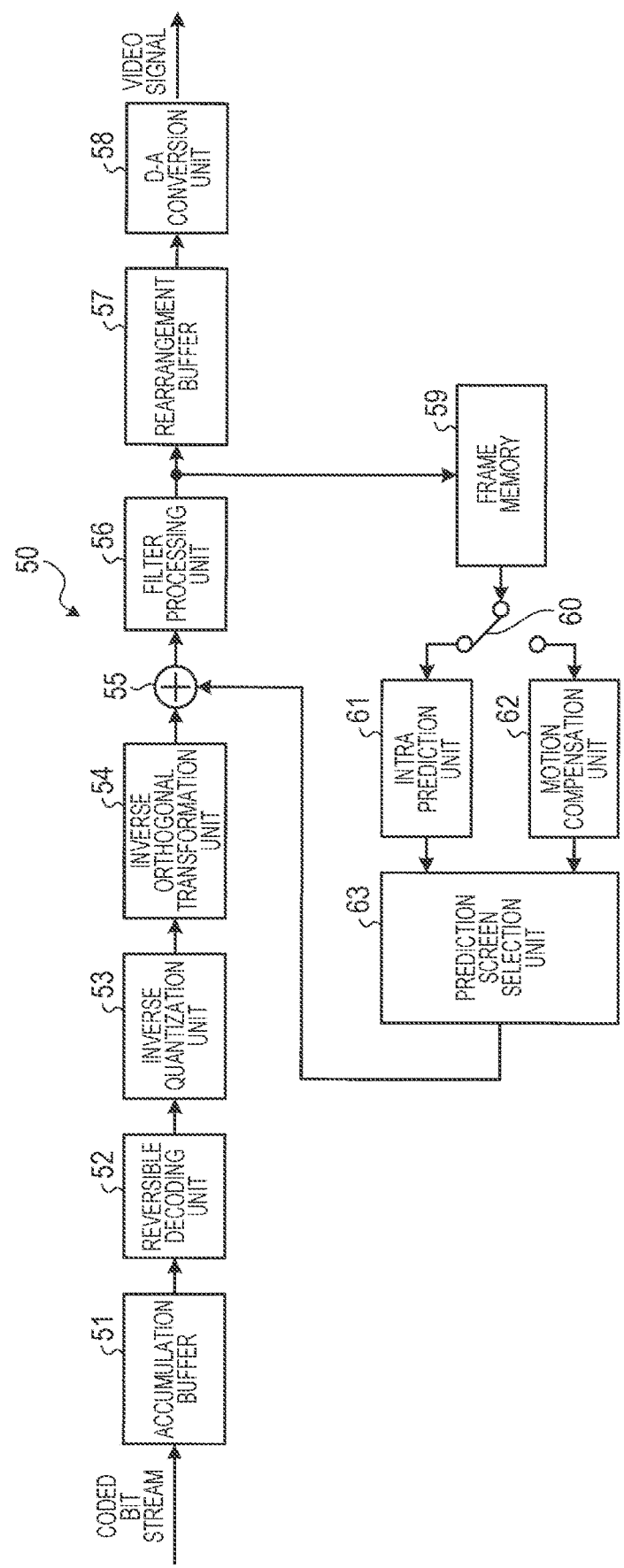
FIG. 14 is a diagram illustrating a configuration of an image decoding device of a second embodiment of the present disclosure.

FIG. 14 illustrates a configuration in a case where the information processing device of the present disclosure is applied to an image decoding device. The image decoding device 50 includes an accumulation buffer 51, a reversible decoding unit 52, an inverse quantization unit 53, an inverse orthogonal transformation unit 54, an addition unit 55, a filter processing unit 56, a rearrangement buffer 57, and a D-A conversion unit 58. Moreover, the image decoding device 50 includes a frame memory 59, a selector 60, an intra prediction unit 61, a motion compensation unit 62, and a prediction image selection unit 63.

The accumulation buffer 51 accumulates the coded bit stream transmitted from the image coding device 10.

The reversible decoding unit 52 decodes the coded bit stream supplied from the accumulation buffer 51 by a method corresponding to a coding method of the reversible coding unit 16 of the image coding device 10. Further, the reversible decoding unit 52 also outputs prediction mode information obtained by decoding the header information of the coded bit stream to the intra prediction unit 61 and the motion compensation unit 62. Furthermore, the reversible decoding unit 52 supplies parameters related to the decoded deblocking filter to the filter processing unit 56.

The inverse quantization unit 53 inversely quantizes quantized data decoded by the reversible decoding unit 52 by a method corresponding to a quantization method of the quantization unit 15 of the image coding device 10. The inverse orthogonal transformation unit 54 inversely orthogonally transforms an output of the inverse quantization unit 53 by a method corresponding to an orthogonal transformation method of the orthogonal transformation unit 14 of the image coding device 10, and outputs a result to the addition unit 55.

The addition unit 55 adds the data after the inverse orthogonal transformation and prediction image data supplied from the prediction image selection unit 63 to generate decoded image data. The addition unit 55 outputs the generated decoded image data to the filter processing unit 56.

The filter processing unit 56 performs filter processing on the decoded image data supplied from the addition unit 55 similarly to the filter processing unit 22 of the image coding device 10, and outputs a filtering result to the rearrangement buffer 57 and the frame memory 59.

The rearrangement buffer 57 rearranges the frames. That is, the order of the frames rearranged for the coding order by the rearrangement buffer 12 of the image coding device 10 is rearranged in the original display order, and it is output to the D-A conversion unit 58.

The D-A conversion unit 58 performs D-A conversion on image data supplied from the rearrangement buffer 57, and outputs the image data to a display (not illustrated) to cause display of the image.

The frame memory 59 retains the decoded image data after the filter processing supplied from the filter processing unit 56 as image data of a reference image.

When decoding a prediction block for which intra prediction has been performed is performed on the basis of the prediction mode information supplied from the reversible decoding unit 52, the selector 60 supplies reference image data before filter processing read from the frame memory 59 to the intra prediction unit 61. Furthermore, when decoding a prediction block for which an inter prediction has been performed is performed on the basis of the prediction mode information supplied from the reversible decoding unit 52, the selector 60 supplies reference image data after filter processing read from the frame memory 59 to the motion compensation unit 62.

The intra prediction unit 61 generates a prediction image on the basis of the prediction mode information supplied from the reversible decoding unit 52, and outputs the generated prediction image data to the prediction image selection unit 63.

The motion compensation unit 62 performs motion compensation on the basis of the prediction mode information supplied from the reversible decoding unit 52, generates prediction image data, and outputs the prediction image data to the prediction image selection unit 63. That is, on the basis of motion vector information and reference frame information included in the prediction mode information, the motion compensation unit 62 performs the motion compensation on a reference image indicated by the reference frame information with a motion vector based on the motion vector information, and generates prediction image data.

The prediction image selection unit 63 supplies the prediction image data generated by the intra prediction unit 61 to the addition unit 55. Furthermore, the prediction image selection unit 63 also supplies the prediction image data generated by the motion compensation unit 62 to the addition unit 55.

2-2. Operation of Image Decoding Device

Figure 15:
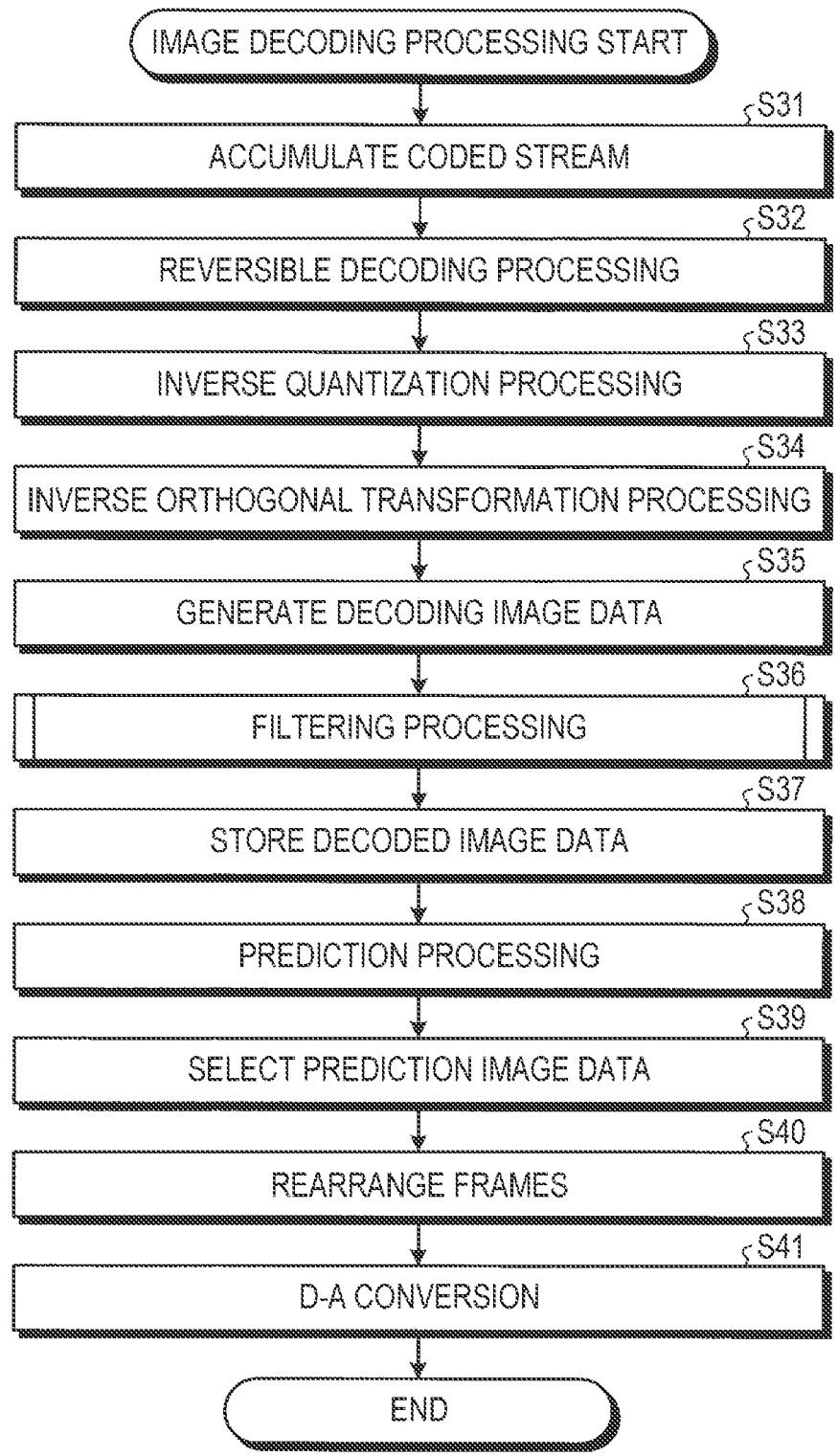
FIG. 15 is a flowchart illustrating a flow of image decoding processing.

Next, an image decoding operation performed by the image decoding device 50 will be described with reference to FIG. 15. FIG. 15 is a flowchart illustrating a flow of image decoding processing.

In step S31, the accumulation buffer 51 accumulates the transmitted coded bit stream. In step S32, the reversible decoding unit 52 performs reversible decoding processing. The reversible decoding unit 52 decodes the coded bit stream supplied from the accumulation buffer 51. That is, the quantized data of each picture coded by the reversible coding unit 16 in FIG. 1 is obtained. Furthermore, the reversible decoding unit 52 performs reversible decoding of the prediction mode information included in the header information of the coded bit stream, and supplies the obtained prediction mode information to the filter processing unit 56, the selector 60, and the prediction image selection unit 63. Moreover, in a case where the prediction mode information is information regarding an intra prediction mode, the reversible decoding unit 52 outputs the prediction mode information to the intra prediction unit 61. Furthermore, in a case where the prediction mode information is information regarding an inter prediction mode, the reversible decoding unit 52 outputs the prediction mode information to the motion compensation unit 62.

In step S33, the inverse quantization unit 53 performs inverse quantization processing. The inverse quantization unit 53 inversely quantizes the quantized data decoded by the reversible decoding unit 52 with a characteristic corresponding to the characteristic of the quantization unit 15 in FIG. 1.

In step S34, the inverse orthogonal transformation unit 54 performs inverse orthogonal transformation processing. The inverse orthogonal transformation unit 54 inversely orthogonally transforms transformation coefficient data inversely quantized by the inverse quantization unit 53 with a characteristic corresponding to the characteristic of the orthogonal transformation unit 14 in FIG. 1.

In step S35, the addition unit 55 generates decoded image data. The addition unit 55 adds data obtained by performing the inverse orthogonal transformation processing and the prediction image data selected in step S39 as described later to generate the decoded image data. Thus, the original image is decoded.

Figure 17:
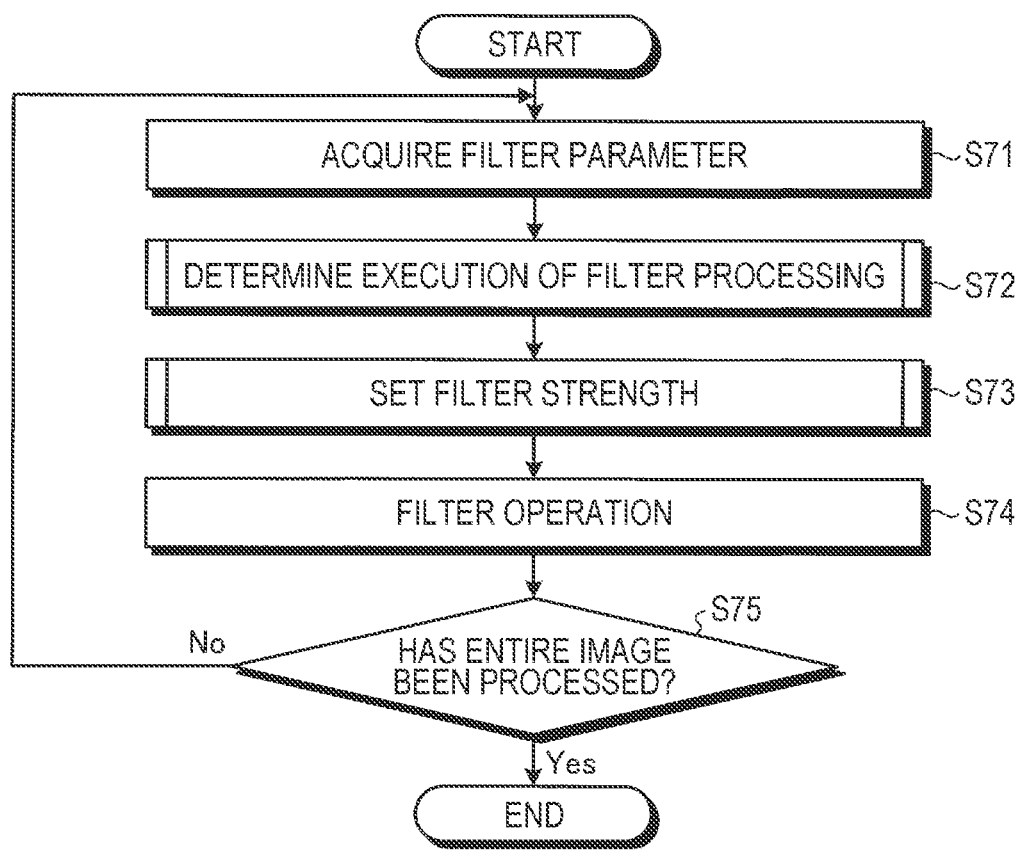
FIG. 17 is a flowchart illustrating an example of a flow of processing performed by the filter processing unit according to the second embodiment.

In step S36, the filter processing unit 56 performs the deblocking filter processing. The filter processing unit 56 performs filter processing on the decoded image data output from the addition unit 55 to remove the block noise included in the decoded image. Note that contents of the processing performed by the filter processing unit 56 will be described later in detail (FIG. 17).

In step S37, the frame memory 59 stores the decoded image data.

In step S38, the intra prediction unit 61 and the motion compensation unit 62 perform prediction processing. Each of the intra prediction unit 61 and the motion compensation unit 62 performs the prediction processing corresponding to the prediction mode information supplied from the reversible decoding unit 52.

That is, in a case where the prediction mode information of the intra prediction is supplied from the reversible decoding unit 52, the intra prediction unit 61 performs the intra prediction processing on the basis of the prediction mode information and generates the prediction image data. Furthermore, in a case where the prediction mode information of the inter prediction is supplied from the reversible decoding unit 52, the motion compensation unit 62 performs motion compensation on the basis of the prediction mode information, and generates the prediction image data.

In step S39, the prediction image selection unit 63 selects the prediction image data. That is, the prediction image selection unit 63 selects the prediction image supplied from the intra prediction unit 61 and the prediction image data generated by the motion compensation unit 62, and supplies them to the addition unit 55, causing the prediction image and the prediction image data to be added to an output of the inverse orthogonal transformation unit 54 in step S35 as described above.

In step S40, the rearrangement buffer 57 rearranges the frames. That is, the rearrangement buffer 57 rearranges the order of the frames rearranged for coding by the rearrangement buffer 12 of the image coding device 10 in FIG. 1 to the original display order.

In step S41, the D-A conversion unit 58 performs D-A conversion on the image data from the rearrangement buffer 57. This image is output to the display (not illustrated) to cause display of the image.

Figure 16:
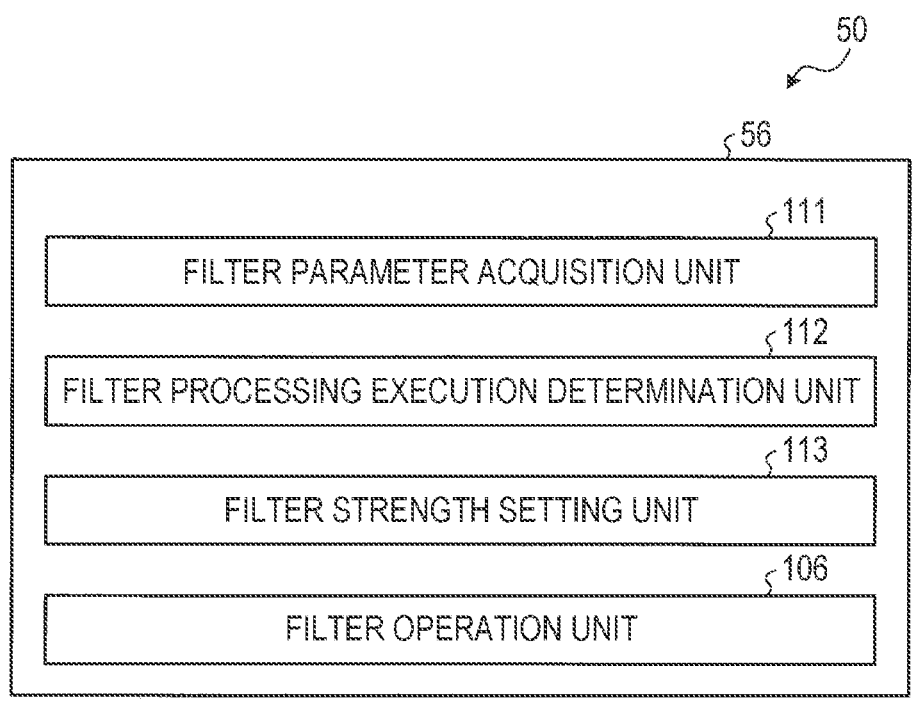
FIG. 16 is a functional block diagram illustrating an example of a functional configuration of a filter processing unit according to the second embodiment.

2-3. Description of Functional Configuration of Filter Processing Unit of Second Embodiment FIG. 16 is a functional block diagram illustrating an example of a functional configuration of the filter processing unit 56 of the image decoding device 50. The filter processing unit 56 includes a filter parameter acquisition unit 111, a filter processing execution determination unit 112, a filter strength setting unit 113, and a filter operation unit 106.

The filter parameter acquisition unit 111 acquires parameters related to the deblocking filter from the header information of the coded bit stream decoded by the reversible decoding unit 52 (FIG. 15). Specifically, the flag for switching presence or absence of the processing of the deblocking filter, and the threshold β and the threshold tc for each division depth value Dv are acquired, which are parameters related to the deblocking filter described in the picture parameter set or the slice header described in the first embodiment (see FIGS. 12A and 12B). Note that these parameters related to the deblocking filter are information stored in the header information of the coded bit stream by the transmission information generation unit 107 of the image coding device 10 as described in the first embodiment.

The filter processing execution determination unit 112 determines whether or not to cause the deblocking filter to operate on the block boundary Bv on the basis of the parameters related to the deblocking filter acquired by the filter parameter acquisition unit 111.

The filter strength setting unit 113 sets the strength of the deblocking filter to operate on the block boundary Bv on the basis of the parameter related to the deblocking filter acquired by the filter parameter acquisition unit 111.

The filter operation unit 106 causes the deblocking filter set by the filter strength setting unit 113 to operate on the predetermined block boundary Bv. Note that the configuration of the filter operation unit 106 is as described in the first embodiment.

Note that the filter processing unit 56 causes the deblocking filter to operate on both the vertical block boundary and the horizontal block boundary of the decoded image.

2-4. Description of Operation of Filter Processing Unit

FIG. 17 is a flowchart illustrating an example of a flow of processing performed by the filter processing unit 56 according to the second embodiment. The processing illustrated in this flowchart describes the processing performed in step S36 in FIG. 15 in detail.

The filter parameter acquisition unit 111 acquires a parameter related to the deblocking filter from the header of the coded bit stream (step S71).

The filter processing execution determination unit 112 determines whether or not to cause the deblocking filter to operate on the block boundary Bv (step S72). Note that the specific processing performed in step S72 is steps S57 and S58 in FIG. 13.

The filter strength setting unit 113 sets the strength of the deblocking filter to operate on the block boundary Bv (step S73). Note that the specific processing performed in step S73 is steps S59 to S63 in FIG. 13.

The filter operation unit 106 causes the set deblocking filter to operate (step S74).

The filter parameter acquisition unit 111 determines whether all pieces of information related to the deblocking filter have been acquired, that is, whether the entire image has been processed (step S75). If it is determined that the entire image has been processed (step S75: Yes), the processing of FIG. 17 ends. On the other hand, when it is not determined that the entire image has been processed (step S75: No), the processing returns to step S71 and the above-described processing is repeated.

Note that in a case where the deblocking filter is caused to operate on the boundary of the blocks in the horizontal direction, it is only required to perform the same calculation and determination as those described in FIG. 17 on the blocks adjacent to the upper and lower sides of the boundary of the blocks.

2-5. Effects of Second Embodiment

As described above, in the image decoding device 50 of the second embodiment, the filter parameter acquisition unit 111 acquires parameters related to the deblocking filter set on the basis of the depth value corresponding to the division state of each block adjacent to the block boundary for the image divided into the plurality of blocks. Then, the filter processing execution determination unit 112 determines whether or not to cause the deblocking filter to operate on the block boundary Bv on the basis of an acquired parameter (flag for switching presence or absence of the processing of the deblocking filter). Then, the filter strength setting unit 105 sets the strength of the deblocking filter to operate on the block boundary Bv on the basis of acquired parameters (the threshold β and the threshold tc for each division depth value Dv).

Thus, the image decoding device 50 adaptively sets the strength of the deblocking filter to operate according to the division depth value Dv of the block boundary Bv, and thus it becomes easy for the strong filter to operate on a large block. Furthermore, it becomes easy for the weak filter to operate on the small block. Accordingly, the block noise can be reduced.

3. Third Embodiment

In the image coding device 10 described in the first embodiment, the strength of the deblocking filter to operate changes on the left and right sides of the block boundary Bv depending on the configuration of divided blocks. That is, it has been possible that the image quality becomes non-uniform near the left and right edges of the blocks.

Figure 18:
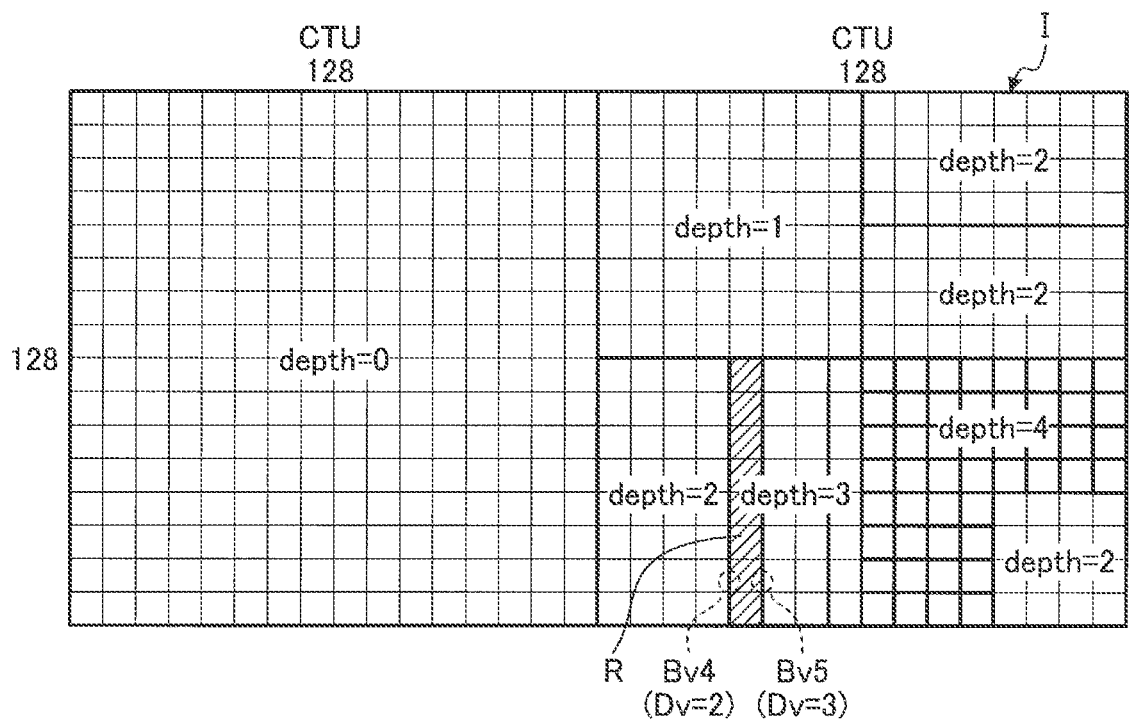
FIG. 18 is a diagram illustrating an example of a case where image quality is non-uniform near left and right edges of a block.

For example, FIG. 18 is a diagram illustrating an example of a case where the image quality becomes non-uniform near the left and right block boundaries of a block R. A case where the strength of the deblocking filter caused to operate by an image coding device 10a described in the first embodiment is set for a block boundary Bv4 and a block boundary Bv5 of an image I illustrated in FIG. 18 will be considered. The block boundary Bv4 is a boundary between a block on the left side with the depth value Da=2 and a block on the right side with the depth value Db=3. Thus, the division depth value Dv of the block boundary Bv4 is two. Therefore, according to the threshold correction table Tb3 of FIG. 11, the offset value of the threshold β is zero, and the offset value of the threshold tc is zero.

Similarly, the block boundary Bv5 is a boundary between a block on the left side with the depth value Da=3 and a block on the right side with the depth value Db=3. Thus, the division depth value Dv at the block boundary Bv5 is three. Therefore, according to the threshold correction table Tb3 of FIG. 11, the offset value of the threshold β is −3, and the offset value of the threshold tc is −3. That is, the strength of the deblocking filter to operate on the block boundary Bv4 is stronger than the strength of the deblocking filter to operate on the block boundary Bv5.

Thus, near the left and right edges of the block R illustrated in FIG. 18, the image quality may become non-uniform. The image coding device 10a of the third embodiment of the present disclosure can make the left and right image qualities of such a block R uniform. Note that the image coding device 10a is an example of an information processing device in the present disclosure.

3-1. Description of Functional Configuration of Filter Processing Unit

The image coding device 10a (not illustrated) of the present embodiment has a configuration including a filter processing unit 22a (not illustrated) instead of the filter processing unit 22 (FIG. 10) of the image coding device 10. Then, the filter processing unit 22a includes a depth value calculation unit 102a (not illustrated) instead of the depth value calculation unit 102.

The depth value calculation unit 102a calculates the division depth value Dv of the block boundary Bv on the basis of the block lengths of respective blocks adjacent to the left and right (or upper and lower) sides of the block boundary Bv. Specifically, the depth value calculation unit 102a calculates the division depth value Dv of the block boundary Bv according to the number of times of division of blocks corresponding to a longer block length among block lengths of the respective blocks adjacent to the left and right sides of the block boundary. Furthermore, the depth value calculation unit 102a calculates the division depth value Dv of the block boundary Bv according to the number of times of division of blocks corresponding to a longer block length among block lengths of the respective blocks adjacent to the upper and lower sides of the block boundary Bv.

Figure 19:
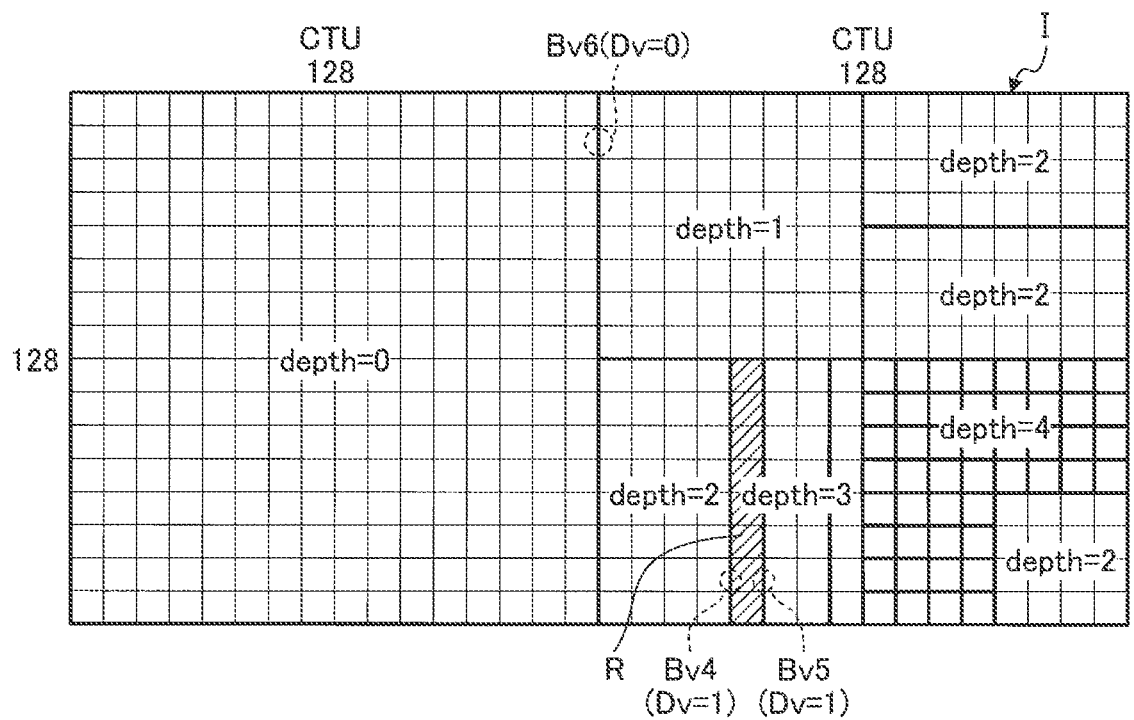
FIG. 19 is a diagram illustrating an example of division depth values calculated by a filter processing unit according to a third embodiment.

FIG. 19 is a diagram illustrating an example of the division depth value Dv calculated by the filter processing unit 22a according to the third embodiment.

For example, in FIG. 19, the block length of the block adjacent to the left side of the block boundary Bv4 is 64. Then, the block length of the block adjacent to the right side of the block boundary Bv4 is 64. Then, the depth value corresponding to the block length 64 is one. Therefore, the division depth value Dv at the block boundary Bv4 is one.

Furthermore, in FIG. 19, the block length of the block adjacent to the left side of the block boundary Bv5 is 64. Then, the block length of the block adjacent to the right side of the block boundary Bv5 is 64. Then, the depth value corresponding to the block length 64 is one. Therefore, the division depth value Dv at the block boundary Bv5 is one.

That is, in the image coding device 10a of the present embodiment, the difference in the division depth value Dv between the left and right of the block R described in FIG. 18 does not occur.

Next, the division depth value Dv at a block boundary Bv6 will be described using an image I illustrated in FIG. 19. In this case, the block length of the block on the left side of the block boundary Bv6 is 128, and the block length of the block on the right side of the block boundary Bv6 is 64. Then, the long block length 128 is employed to calculate the division depth value Dv. Then, zero, which is the depth value corresponding to the block length 128, is set as the division depth value Dv at the block boundary Bv6.

Note that in a case where there are no left and right or upper and lower blocks adjacent to the block boundary, that is, in the edge of the image, the block length is set to zero.

Furthermore, when calculating the depth value from the block length, Equation (32) is used.

[Equation 32]

$$depth = \log_2(CTU\ size/block\ length) \qquad (32)$$

For the depth value at the block boundary calculated in this manner, the offset values of the threshold β and the threshold tc are set on the basis of the threshold correction table Tb3 of FIG. 11 similarly to that described in the first embodiment. Then, the deblocking filter having the filter strength set on the basis of the threshold β, the threshold tc, and the like is caused to operate on the image I.

Furthermore, the offset value of the threshold β and the offset value of the threshold tc for each division depth value Dv of the block boundary Bv are stored in the header of the coded bit stream and transmitted by a method similar to that described in the first embodiment.

3-2. Description of Operation of Filter Processing Unit

Figure 20:
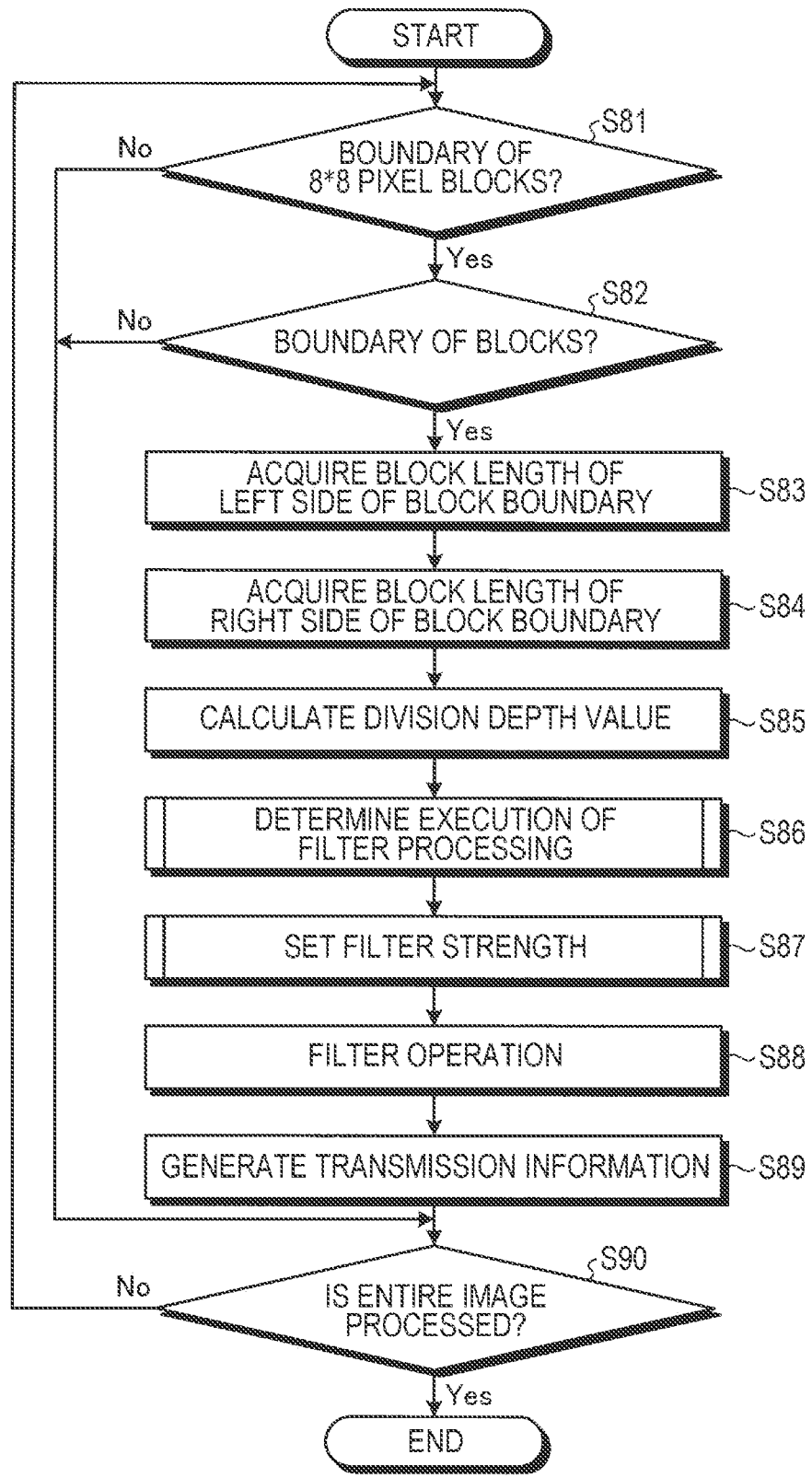
FIG. 20 is a flowchart illustrating an example of a flow of processing performed by the filter processing unit according to the third embodiment.

Next, a flow of processing performed by the filter processing unit 22a will be described using FIG. 20. FIG. 20 is a flowchart illustrating an example of a flow of processing performed by the filter processing unit 22a according to the third embodiment.

The block boundary detection unit 101 determines whether it is a block boundary of 8*8 pixels which is a unit in which the deblocking filter operates (step S81). If it is determined to be the block boundary of 8*8 pixels (step S81: Yes), the processing proceeds to step S82. On the other hand, if it is not determined to be the block boundary of 8*8 pixels (step S81: No), the processing proceeds to step S90.

Subsequently, the block boundary detection unit 101 determines whether it is a boundary of blocks (step S82). If it is determined to be the boundary of blocks (step S82: Yes), the processing proceeds to step S83. On the other hand, if it is not determined to be the boundary of blocks (step S82: No), the processing proceeds to step S90.

Next, the depth value calculation unit 102a acquires the block length of the block Ba on the left side of the block boundary Bv (step S83).

Moreover, the depth value calculation unit 102a acquires the block length of the block Bb on the right side of the block boundary Bv (step S84).

Then, the depth value calculation unit 102a calculates the division depth value Dv of the block boundary Bv on the basis of the longer block length of the block length of the block Ba and the block length of the block Bb (step S85).

Next, the filter processing execution determination unit 104 determines whether or not to cause the deblocking filter to operate on the block boundary Bv (step S86). Note that the specific processing performed in step S86 is steps S57 and S58 in FIG. 13.

Subsequently, the filter strength setting unit 105 sets the strength of the deblocking filter to operate on the block boundary Bv (step S87). Note that the specific processing performed in step S87 is steps S59 to S63 in FIG. 13.

Then, the filter operation unit 106 causes the set deblocking filter to operate (step S88).

The block boundary detection unit 101 determines whether the entire image has been processed (step S90). If it is determined that the entire image has been processed (step S90: Yes), the processing of FIG. 20 ends. On the other hand, if it is not determined that the entire image has been processed (step S90: No), the processing returns to step S81 and the above-described processing is repeated.

Note that in a case where the deblocking filter is caused to operate on the boundary of the blocks in the horizontal direction, it is only required to perform the same calculation and determination as those described in FIG. 20 on the blocks adjacent to the upper and lower sides of the boundary of the blocks.

3-3. Effects of Third Embodiment

As described above, in the image coding device 10a of the third embodiment, the depth value calculation unit 102a determines the division depth value Dv of the block boundary Bv on the basis of the block lengths of respective blocks adjacent to the left and right (or upper and lower) sides of the block boundary Bv.

Thus, an image coding device 10b can equalize the strength of the deblocking filter on the left and right (or upper and lower) sides of the block, and thus can equalize the image quality.

Furthermore, in the image coding device 10a of the third embodiment, the depth value calculation unit 102a calculates the division depth value Dv of the block boundary Bv according to the number of times of division of the block corresponding to the longer block length among the block lengths of the respective blocks adjacent to the left and right (or upper and lower) sides of the block boundary Bv.

Thus, in the image coding device 10a, it becomes easy for the strong filter to operate on a large block. Furthermore, it becomes easy for the weak filter to operate on the small block. Accordingly, the block noise can be reduced.

4. Fourth Embodiment

The size of the CTU in the VVC method is 128*128 pixels as described above, which is larger than the size of the CTU in the HEVC method (64*64 pixels). Therefore, by causing the deblocking filter to operate, it has been possible that the block noise occurs in a large block. Thus, in a large block, in order to suppress occurrence of the block noise, it is desirable to set the deblocking filter to easily operate and allow the strong filter to operate. However, if the strong filter operates on a fine block, texture of an image is lost, and image quality may be deteriorated. Accordingly, it has not been possible to cause the deblocking filter according to the state of block division of the image to operate.

A fourth embodiment of the present disclosure is an example of an image coding device 10b that controls the operation of the deblocking filter according to the position of the block boundary in the image. Note that the image coding device 10b is an example of an information processing device in the present disclosure.

4-1. Description of Functional Configuration of Filter Processing Unit

An image coding device 10b (not illustrated) of the present embodiment has a configuration including a filter processing unit 22b (not illustrated) instead of the filter processing unit 22 (FIG. 10) of the image coding device 10. Then, the filter processing unit 22b includes a depth value calculation unit 102b (not illustrated) instead of the depth value calculation unit 102.

The depth value calculation unit 102b calculates the division depth value Dv of the block boundary Bv on the basis of the position of the block boundary Bv in the image. That is, the depth value calculation unit 102b calculates the division depth value Dv according to only coordinates of the block boundary Bv regardless of the division shape of the block.

Note that the method of transmitting the offset of the threshold β and the offset of the threshold tc for each division depth value Dv of the block boundary Bv is the same as the method described in the first embodiment.

Figure 21:
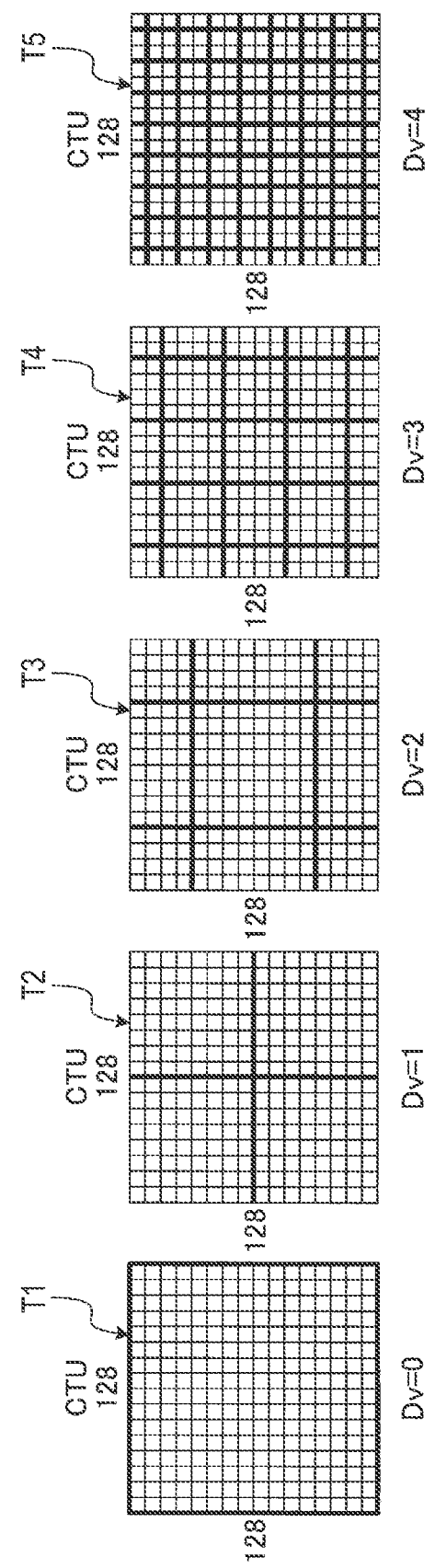
FIG. 21 is a diagram illustrating examples of tables for determining a division depth value according to positions of block boundaries.

FIG. 21 is a diagram illustrating examples of tables for determining the division depth value Dv according to positions of block boundaries. In particular, FIG. 21 is a table illustrating states in which the CTU having a size of 128*128 pixels is divided according to the quad tree structure.

As illustrated in FIG. 21, coordinate values in the table and the division depth value Dv are uniquely associated with each other according to the number of times of division of the block.

Specifically, a table T1 indicates that the division depth value Dv of a block boundary Bv is set to zero in a case where the position of the block boundary Bv coincides with a coordinate position indicated by a thick line in a block of 128*128 pixel size.

Similarly, a table T2 indicates that the division depth value Dv of block boundaries By is set to one in a case where the positions of the block boundaries By coincide with coordinate positions indicated by thick lines in blocks of 64*64 pixel size.

Furthermore, a table T3 indicates that the division depth value Dv of block boundaries By is set to two in a case where the positions of the block boundaries By coincide with coordinate positions indicated by thick lines in blocks of 64*64 pixel size. Note that the table T2 and the table T3 have different dividing positions.

Furthermore, a table T4 indicates that the division depth value Dv of block boundaries By is set to three in a case where the positions of the block boundaries By coincide with coordinate positions indicated by thick lines in blocks of 32*32 pixel size.

Then, a table T5 indicates that the division depth value Dv of block boundaries By is set to four in a case where the positions of the block boundaries By coincide with coordinate positions indicated by thick lines in blocks of 16*16 pixel size.

Figure 22:
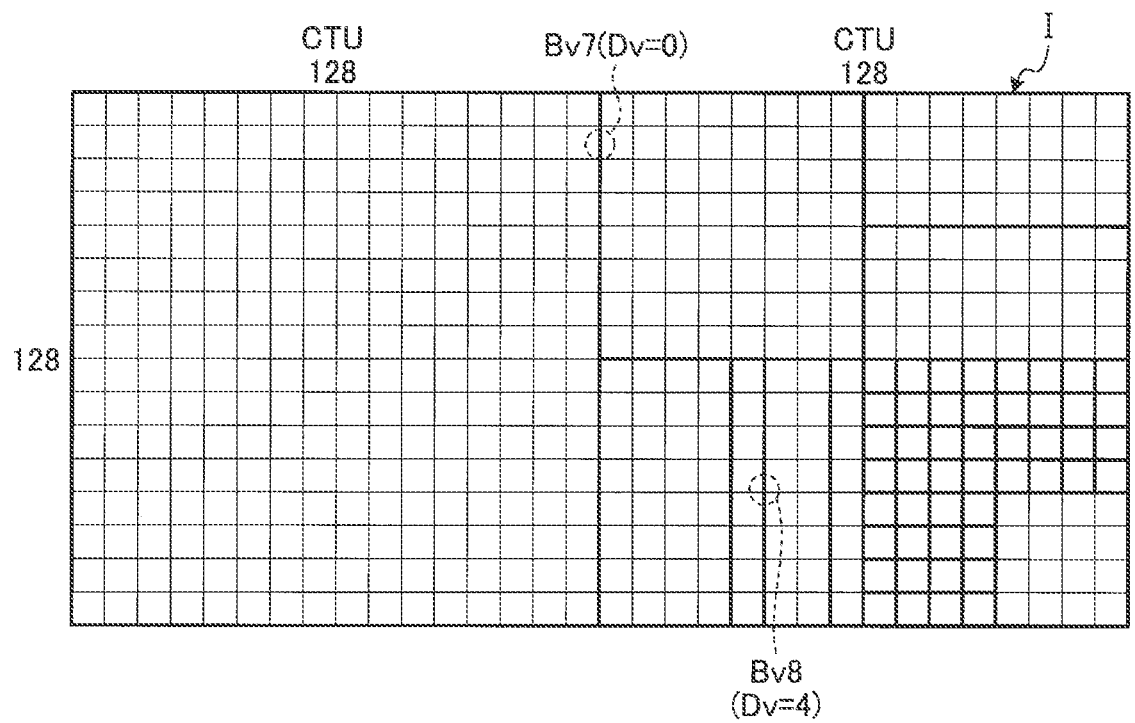
FIG. 22 is a diagram illustrating an example of division depth values calculated by a filter processing unit according to a fourth embodiment.

FIG. 22 is a diagram illustrating an example of the division depth value Dv calculated by the filter processing unit 22b according to the fourth embodiment. A method of calculating the division depth value Dv at a block boundary Bv7 and a block boundary Bv8 will be described using FIG. 22.

In an image I of FIG. 22, attention is paid to CTUs to which the block boundary Bv7 belongs. In the example of FIG. 22, the block boundary Bv7 belongs to both of two CTUs existing inside the image I. It may be assumed as belonging to any CTU, but here, it is described as belonging to the CTU on the right side.

At this time, the block boundary Bv7 belongs to an outer edge on a left side of the CTU. Then, the division depth value Dv=0 is assigned to the outer edge on the left side of the CTU by the table T1 of FIG. 21. Therefore, the division depth value Dv of the block boundary Bv7 becomes zero.

Next, a method of calculating the division depth value Dv of the block boundary Bv8 will be described. The block boundary Bv8 belongs to the CTU on the right side among the two CTUs existing inside the image I. Then, the block boundary Bv8 is at a position of 40 pixels from the left of the CTU. Then, the division depth value Dv=4 is assigned to the position of 40 pixels from the left of the CTU by the table T5 of FIG. 21. Therefore, the division depth value Dv of the block boundary Bv8 is four.

In this manner, by collating the position of the block boundary Bv in the image I with the tables T1 to T5 of FIG. 21, the division depth value Dv of the block boundary Bv is uniquely determined.

The filter processing unit 22b sets the offset values of the threshold β and the threshold tc with respect to the division depth value Dv calculated in this manner on the basis of the threshold correction table Tb3 of FIG. 11 similarly to that described in the first embodiment. Then, the filter processing unit 22b causes the deblocking filter of the filter strength set on the basis of the threshold β, the threshold tc, and the like to operate on the image I.

Furthermore, the offset value of the threshold β and the offset value of the threshold tc for each division depth value Dv of the block boundary Bv are stored in the header of the coded bit stream and transmitted by a method similar to that described in the first embodiment.

4-2. Description of Operation of Filter Processing Unit

Figure 23:
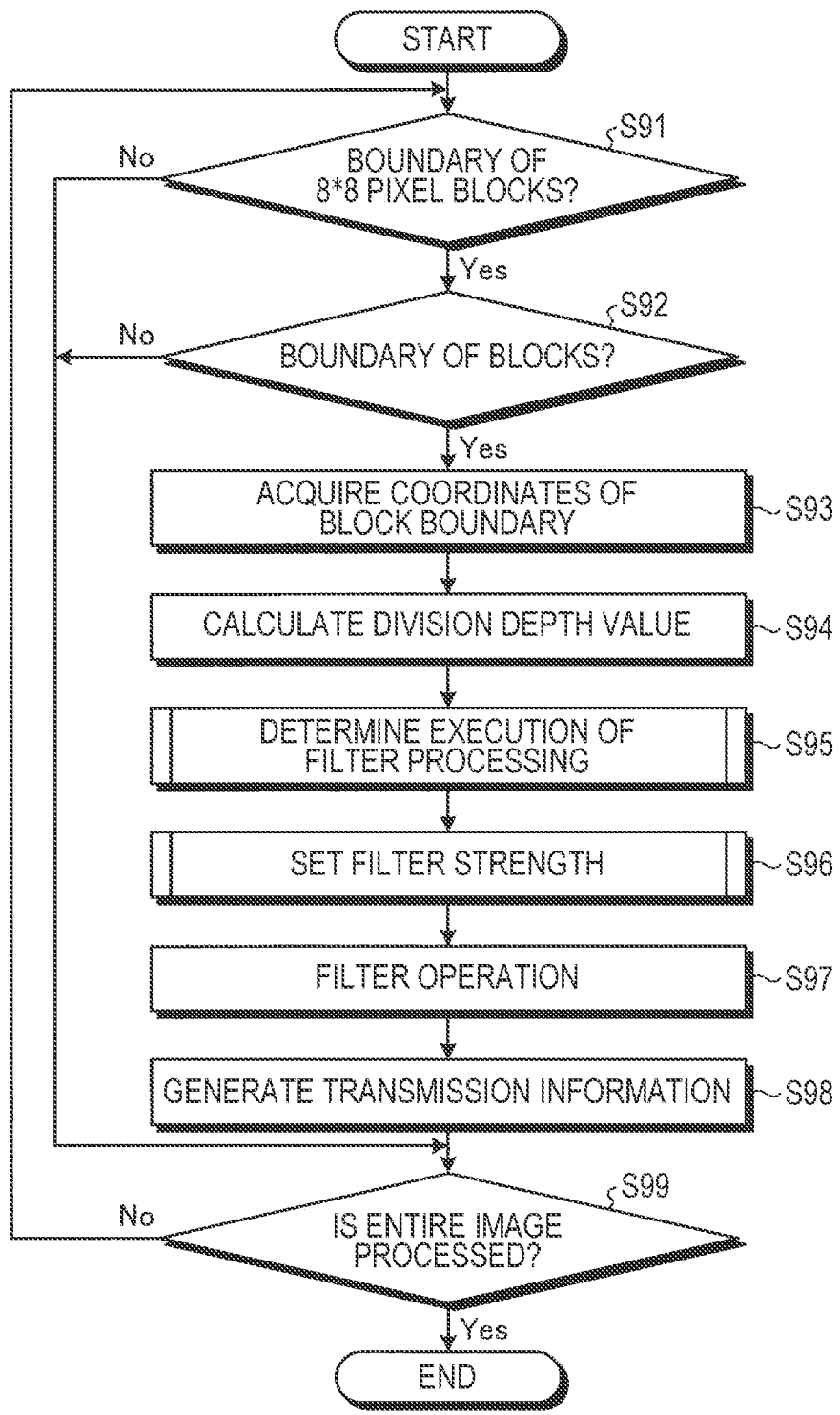
FIG. 23 is a flowchart illustrating an example of a flow of processing performed by the filter processing unit according to the fourth embodiment.

FIG. 23 is a flowchart illustrating an example of a flow of processing performed by the filter processing unit 22b according to the fourth embodiment.

The block boundary detection unit 101 determines whether it is a block boundary of 8*8 pixels which is a unit in which the deblocking filter operates (step S91). If it is determined to be the block boundary of 8*8 pixels (step S91: Yes), the processing proceeds to step S92. On the other hand, if it is not determined to be the block boundary of 8*8 pixels (step S91: No), the processing proceeds to step S99.

Subsequently, the block boundary detection unit 101 determines whether it is a boundary of blocks (step S92). If it is determined to be the boundary of blocks (step S92: Yes), the processing proceeds to step S93. On the other hand, if it is not determined to be the boundary of blocks (step S92: No), the processing proceeds to step S99.

Next, the depth value calculation unit 102b acquires the coordinates of the block boundary Bv (step S93).

Then, the depth value calculation unit 102b calculates the division depth value Dv indicated by the coordinates of the block boundary Bv by referring to the tables T1 to T5 (step S94).

Next, the filter processing execution determination unit 104 determines whether or not to cause the deblocking filter to operate on the block boundary Bv (step S95). Note that specific processing performed in step S95 is steps S57 and S58 in FIG. 13.

Subsequently, the filter strength setting unit 105 sets the strength of the deblocking filter to operate on the block boundary Bv (step S96). Note that specific processing performed in step S96 is steps S59 to S63 in FIG. 13.

Then, the filter operation unit 106 causes the set deblocking filter to operate (step S97).

The transmission information generation unit 107 generates information related to the deblocking filter and stores the information in the picture parameter set or the slice header (step S98).

The block boundary detection unit 101 determines whether the entire image has been processed (step S99). If it is determined that the entire image has been processed (step S99: Yes), the processing of FIG. 23 ends. On the other hand, if it is not determined that the entire image has been processed (step S99: No), the processing returns to step S91 and the above-described processing is repeated.

4-3. Effects of Fourth Embodiment

As described above, in the image coding device 10b of the fourth embodiment, the depth value calculation unit 102b calculates the division depth value Dv of a block boundary Bv on the basis of the position of the block boundary Bv.

Thus, the image coding device 10c can assign the division depth value Dv according to the number of times of division of the block to the block boundary, and thus it is possible to cause the deblocking filter according to the state of the image to operate. In particular, in the image coding device 10b of the fourth embodiment, since the coordinate values of the block boundary Bv and the division depth value Dv are associated with each other, the processing amount when calculating the division depth value Dv can be reduced, and the processing can be efficiently performed.

5. Fifth Embodiment

An image to be coded often includes not only the luminance signal Y but also the color difference signal C. Moreover, in recent years, 4K images and 8K images are being widely used. In a 4K image or an 8K image, an expressible color is greatly enlarged, and thus it is necessary to consider suppression of block noise in the color difference signal as well as suppression of block noise in the luminance signal.

Accordingly, it is desirable to cause a specific deblocking filter to operate on the luminance signal Y and the color difference signal C in accordance with each signal.

A fifth embodiment of the present disclosure is an example of an image coding device that causes deblocking filters having different characteristics to operate on the luminance signal Y and the color difference signal C.

5-1. Description of Functional Configuration of Filter Processing Unit

An image coding device 10 of the present embodiment has the same configuration as the image coding device 10 described in the first embodiment. Then, a filter processing unit 22 (FIG. 10) in the present embodiment causes the deblocking filter to operate on each of the luminance signal Y and the color difference signal C. Note that the image coding device 10c is an example of an information processing device in the present disclosure.

The functional configuration (FIG. 10) of the filter processing unit 22 is as described in the first embodiment. Then, the filter processing execution determination unit 104 and the filter strength setting unit 105 perform execution determination and strength setting, respectively, of the deblocking filter on the luminance signal Y and the color difference signal C. Thus, the offset value of the threshold β and the offset value of the threshold tc are set for each of the luminance signal Y and the color difference signal C.

Then, in the image coding device 10 of the present embodiment, the transmission information generation unit 107 transmits the offset value slice_beta_offset_div2 of the threshold β and the offset value slice_tc_offset_div2 of the threshold tc to the luminance signal Y in the form of the difference value slice_beta_offset_div2_delta[X] and the difference value slice_tc_offset_div2_delta[X].

Moreover, the transmission information generation unit 107 transmits the offset value of the threshold β and the offset value of the threshold tc to the color difference signal C in the following format. Note that since the color difference signal C is further expressed by blue chrominance Cb corresponding to (B (blue component)−Y) and red chrominance Cr corresponding to (R (red component)−Y), it is necessary to set and transmit the offset value of the threshold β and the offset value of the threshold tc for each of the blue chrominance Cb and the red chrominance Cr.

That is, with respect to the color difference signal C (Cb, Cr), the transmission information generation unit 107 transmits the offset values slice_beta_offset_cb_div2 and slice_beta_offset_cr_div2 of the threshold β and the offset values slice_tc_offset_cb_div2 and slice_tc_offset_cr_div2 of the threshold tc in the form of difference values slice_beta_offset_div2_cb_delta[X] and slice_beta_offset_div2_cr_delta[X] and difference values slice_tc_offset_div2_cb_delta[X] and slice_tc_offset_div2_cr_delta[X].

5-2. Description of Operation of Filter Processing Unit

Figure 24:
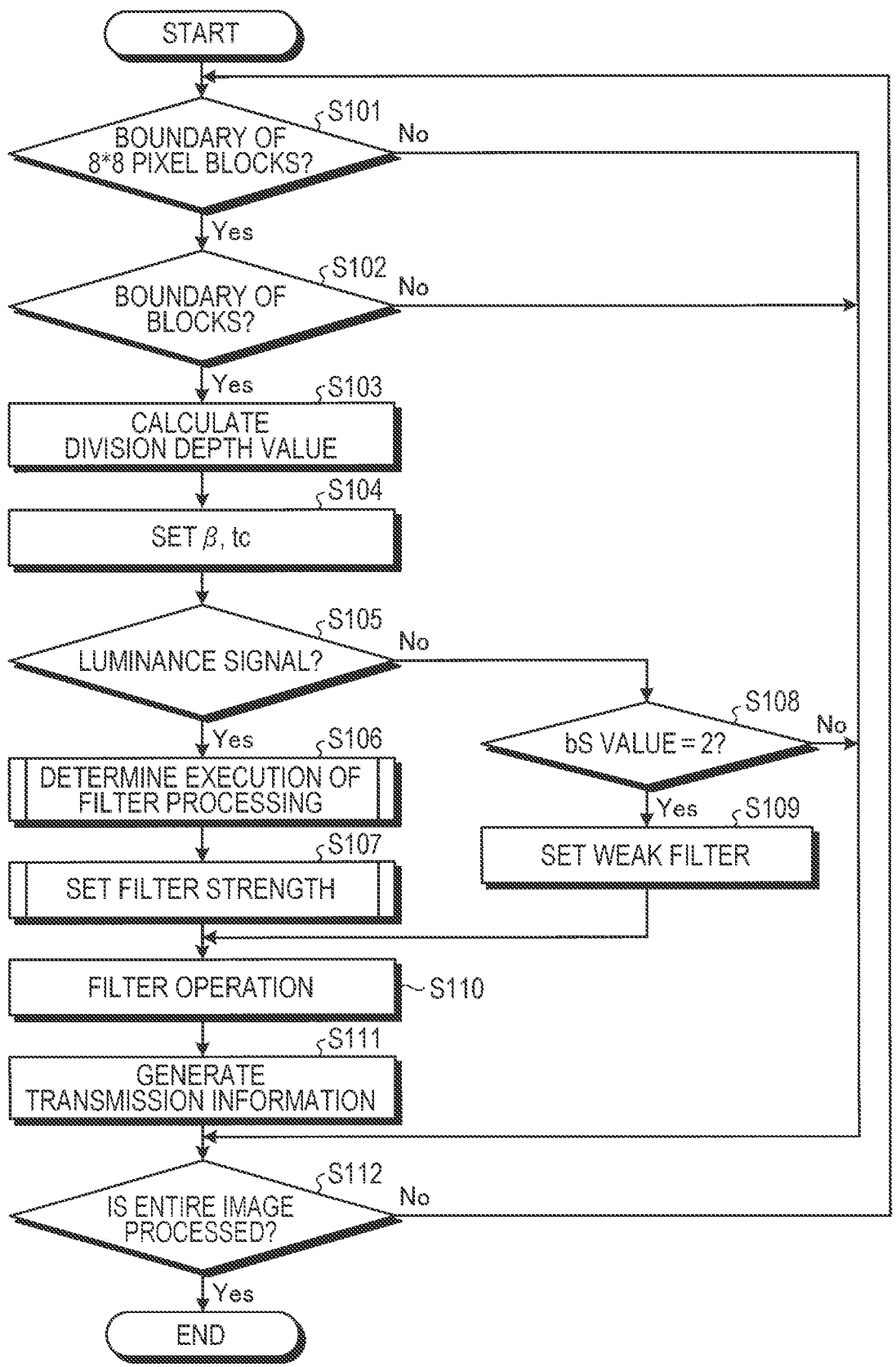
FIG. 24 is a flowchart illustrating an example of a flow of processing performed by a filter processing unit according to a fifth embodiment.

FIG. 24 is a flowchart illustrating an example of a flow of processing performed by the filter processing unit 22 according to the fifth embodiment.

The block boundary detection unit 101 determines whether it is a block boundary of 8*8 pixels which is a unit in which the deblocking filter operates (step S101). If it is determined to be the block boundary of 8*8 pixels (step S101: Yes), the processing proceeds to step S102. On the other hand, if it is not determined to be the block boundary of 8*8 pixels (step S101: No), the processing proceeds to step S112.

Subsequently, the block boundary detection unit 101 determines whether it is a boundary of blocks (step S102). If it is determined to be the boundary of blocks (step S102: Yes), the processing proceeds to step S103. On the other hand, if it is not determined to be the boundary of blocks (step S102: No), the processing proceeds to step S112.

The depth value calculation unit 102 calculates the division depth value Dv of the block boundary Bv on the basis of the depth value Da and the depth value Db of blocks adjacent to the left and right sides of the block boundary Bv (step S103).

Next, the $\beta$, tc setting unit 103 sets the threshold $\beta$ and the threshold tc (step S104).

The filter processing execution determination unit 104 determines whether the signal to be processed is the luminance signal Y (step S105). If it is determined that the signal to be processed is the luminance signal Y (step S105: Yes), the processing proceeds to step S106. On the other hand, if it is not determined that the signal to be processed is the luminance signal Y (step S105: No), the processing proceeds to step S108.

If it is determined as Yes in step S105, the filter processing execution determination unit 104 determines whether or not to cause the deblocking filter to operate on the block boundary Bv (step S106). Note that the specific processing performed in step S105 is steps S57 and S58 in FIG. 13.

Subsequently, the filter strength setting unit 105 sets the strength of the deblocking filter to operate on the block boundary Bv (step S107). Thereafter, the processing proceeds to step S110. Note that specific processing performed in step S107 is steps S59 to S63 in FIG. 13.

On the other hand, if No is determined in step S105, the filter processing execution determination unit 104 determines whether the bS value of the processing target block is two (step S108). If it is determined that the bS value of the processing target block is two (step S108: Yes), the processing proceeds to step S109. On the other hand, if it is not determined that the bS value of the processing target block is two (step S108: No), the processing proceeds to step S112.

If Yes is determined in step S108, the filter strength setting unit 105 sets the weak filter (step S109). Thereafter, the processing proceeds to step S110.

Subsequent to step S107 or step S109, the filter operation unit 106 causes the set deblocking filter to operate (step S110).

The transmission information generation unit 107 generates information related to the deblocking filter and stores the information in the picture parameter set or the slice header (step S111).

The block boundary detection unit 101 determines whether the entire image has been processed (step S112). If it is determined that the entire image has been processed (step S112: Yes), the processing of FIG. 24 ends. On the other hand, if it is not determined that the entire image has been processed (step S112: No), the processing returns to step S101 and the above-described processing is repeated.

5-3. Effects of Fifth Embodiment

As described above, in the image coding device 10 of the fifth embodiment, in a case where the image is expressed by the luminance signal Y and the color difference signal C, the filter processing execution determination unit 104 and the filter strength setting unit 105 perform the execution determination and the strength setting of the deblocking filter, respectively, on the luminance signal Y and the color difference signal C (Cb, Cr).

Thus, the image coding device 10c adaptively sets the strength of the deblocking filter to operate on both the luminance signal Y and the color difference signal C according to the division depth value Dv of the block boundary Bv, and thus it becomes easy for the strong filter to operate on a large block. Furthermore, it becomes easy for the weak filter to operate on the small block. Accordingly, the block noise can be reduced.

6. Description of Hardware Configuration

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 25:
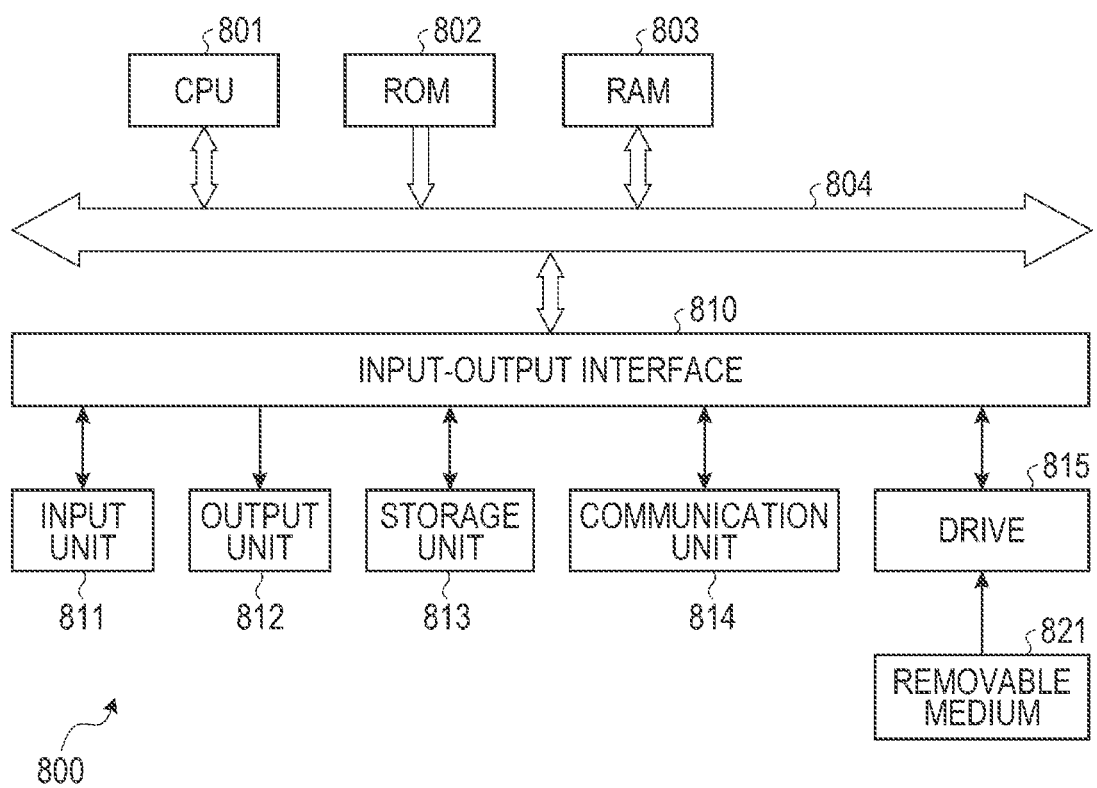
FIG. 25 is a block diagram illustrating an example of a hardware configuration of a computer that executes functions of each embodiment by a program.

FIG. 25 is a block diagram illustrating an example of a hardware configuration of a computer that executes the functions of the respective embodiments by a program.

In a computer 800, a central processing unit (CPU) 801, a read only memory (ROM) 802, and a random access memory (RAM) 803 are interconnected via a bus 804.

An input-output interface 810 is further connected to the bus 804. An input unit 811, an output unit 812, a storage unit 813, a communication unit 814, and a drive 815 are connected to the input-output interface 810.

The input unit 811 includes a keyboard, a mouse, a microphone, and the like. The output unit 812 includes a display, a speaker, and the like. The storage unit 813 includes a hard disk, a nonvolatile memory, and the like. The communication unit 814 includes, for example, a network interface and the like. The drive 815 drives a removable medium 821 such as a magnetic disk, an optical disk, a magneto-optical disk, or a semiconductor memory.

In the computer 800 configured as described above, for example, the CPU 801 loads the program stored in the storage unit 813 into the RAM 803 via the input-output interface 810 and the bus 804 and executes the program, to thereby perform the above-described series of processes.

The program executed by the computer 800 (CPU 801) can be provided by being recorded on, for example, a removable medium 821 as a package medium or the like. Furthermore, the program can be provided via a wired or wireless transmission medium such as a local area network, the Internet, or digital satellite broadcasting.

In the computer 800, the program is installed in the storage unit 813 via the input-output interface 810 by attaching the removable medium 821 to the drive 815. Furthermore, the program may be received by the communication unit 814 via a wired or wireless transmission medium and installed in the storage unit 813. Moreover, the program may be installed in the ROM 802 or the storage unit 813 in advance.

Note that the program executed by the computer 800 may be a program in which processing is performed in time series in the order described in the present disclosure, or may be a program in which processing is performed in parallel or at necessary timing such as when a call is made.

Note that the effects described in the present description are merely examples and are not limited, and other effects may be provided. Furthermore, the embodiment of the present disclosure is not limited to the above-described embodiments, and various modifications can be made without departing from the gist of the present disclosure.

Note that the present disclosure can also have the following configurations.

(1)

An information processing device including:

a depth value calculation unit that calculates, for an image divided into a plurality of blocks, a depth value for determining presence or absence of processing of a deblocking filter and determining strength of the deblocking filter according to a division state of respective blocks adjacent to a block boundary;

a filter processing execution determination unit that determines whether or not to cause the deblocking filter to operate on the block boundary on the basis of the depth value; and a filter strength setting unit that sets the strength of the deblocking filter to operate on the block boundary on the basis of the depth value.

(2)

The information processing device according to (1) above, in which the depth value calculation unit calculates a division depth value of the block boundary according to a number of times of division of respective blocks adjacent to left and right or upper and lower sides of the block.

(3)

The information processing device according to (1) or (2) above, in which the depth value calculation unit sets, as the division depth value of the block boundary, a value corresponding to the number of times of division of blocks having a small number of times of division among the blocks adjacent to the left and right or upper and lower sides of the block boundary.

(4)

The information processing device according to any one of (1) to (3) above, in which the depth value calculation unit sets a sum of the number of times of division according to each branch tree structure when the image is divided into blocks according to an n-branch tree structure (n=2, 3, 4) as the number of times of division of the blocks.

(5)

The information processing device according to (1) above, in which the depth value calculation unit calculates a division depth value of the block boundary according to block lengths of respective blocks adjacent to the left and right or upper and lower sides of the block boundary.

(6)

The information processing device according to (5) above, in which the depth value calculation unit calculates the division depth value of the block boundary on the basis of a number of times of division of blocks corresponding to a longer block length among the block lengths of the respective blocks adjacent to the left and right sides of the block boundary or a number of times of division of blocks corresponding to a longer block length among the block lengths of the respective blocks adjacent to the upper and lower sides of the block boundary.

(7)

The information processing device according to (1) above, in which the depth value calculation unit calculates a division depth value of the block boundary on the basis of a position of the block boundary in the image.

(8)

The information processing device according to any one of (1) to (7) above, in which the filter processing execution determination unit determines that the deblocking filter is easier to operate on the block boundary as a division depth value of the block boundary is smaller, and determines that the deblocking filter is more difficult to operate on the block boundary as the division depth value of the block boundary is larger.

(9)

The information processing device according to any one of (1) to (8) above, in which the filter processing execution determination unit loosely sets a threshold of determining a flatness of a distribution of pixel values near the block boundary as the division depth value of the block boundary is smaller, and strictly sets the threshold of determining the flatness of the distribution of the pixel values near the block boundary as the division depth value of the block boundary is larger.

(10)

The information processing device according to any one of (1) to (9) above, in which the filter strength setting unit sets the strength of the deblocking filter to be stronger as the division depth value of the block boundary is smaller, and sets the strength of the deblocking filter to be weaker as the division depth value of the block boundary is larger.

(11)

The information processing device according to any one of (1) to (10) above, in which the filter strength setting unit sets the strength of the deblocking filter to be stronger in a case where a flatness of a distribution of pixel values near the block boundary is higher than a first predetermined value and a gap between pixel values of pixels sandwiching the block boundary is smaller than a second predetermined value.

(12)

The information processing device according to any one of (1) to (11) above, further including a transmission information generation unit that stores a determination result of the filter processing execution determination unit and a setting threshold set by the filter strength setting unit in a coded bit stream.

(13)

The information processing device according to (12) above, in which the transmission information generation unit stores, in a coded bit stream, a flag that switches presence or absence of processing of the deblocking filter at each block boundary and the setting threshold for each of the depth values.

(14)

The information processing device according to (12) or (13) above, in which
the transmission information generation unit
stores the setting threshold for each of the division depth values in a coded bit stream as a difference value from a predetermined reference value.

(15)

The information processing device according to any one of (1) to (14) above, in which
in a case where the image is represented by a luminance signal and a color difference signal,
the filter processing execution determination unit and the filter strength setting unit
perform execution determination and strength setting of the deblocking filter, respectively, on the luminance signal and the color difference signal, respectively.

(16)

An information processing method including:
calculating, for an image divided into a plurality of blocks, a depth value for determining presence or absence of processing of a deblocking filter and determining strength of the deblocking filter according to a division state of respective blocks adjacent to a block boundary;
determining whether or not to cause the deblocking filter to operate on the block boundary on the basis of the depth value; and
setting the strength of the deblocking filter to operate on the block boundary on the basis of the depth value.

(17)

A program causing a computer included in an information processing device to function as:
a depth value calculation unit that calculates, for an image divided into a plurality of blocks, a depth value for determining presence or absence of processing of a deblocking filter and determining strength of the deblocking filter according to a division state of respective blocks adjacent to a block boundary;
a filter processing execution determination unit that determines whether or not to cause the deblocking filter to operate on the block boundary on the basis of the depth value; and
a filter strength setting unit that sets the strength of the deblocking filter to operate on the block boundary on the basis of the depth value.

REFERENCE SIGNS LIST 10, 10a, 10b, 10c Image coding device (information processing device)
22, 22a, 22b, 56 Filter processing unit
50 Image decoding device (information processing device)
102, 102a, 102b Depth value calculation unit
104 Filter processing execution determination unit
105 Filter strength setting unit
107 Transmission information generation unit
β Threshold
tc Threshold
Bv Block boundary
Da, Db Depth value
Dv Division depth value
Q Quantization parameter

The invention claimed is:

1. An information processing device comprising:
a depth value calculation unit configured to calculate, for an image divided into a plurality of blocks, a depth value to determine presence or absence of processing of a deblocking filter and determine strength of the deblocking filter based on a division state of respective blocks adjacent to a block boundary;
a filter processing execution determination unit configured to determine whether or not to cause the deblocking filter to operate on the block boundary based on the depth value; and
a filter strength setting unit that sets the strength of the deblocking filter to operate on the block boundary based on a based of the depth value,
wherein the depth value calculation unit is further configured to calculate a division depth value of the block boundary based on a position of the block boundary in the image.

2. The information processing device according to claim 1, wherein
the depth value calculation unit is further configured to calculate a division depth value of the block boundary based on a number of times of division of respective blocks adjacent to left and right or upper and lower sides of the block.

3. The information processing device according to claim 2, wherein
the depth value calculation unit configured to set, as the division depth value of the block boundary, a value corresponding to the number of times of division of blocks having a small number of times of division among the blocks adjacent to the left and right or upper and lower sides of the block boundary.

4. The information processing device according to claim 3, wherein
the depth value calculation unit configured to set a sum of the number of times of division based on each branch tree structure when the image is divided into blocks based on an n-branch tree structure (n=2, 3, 4) as the number of times of division of the blocks.

5. The information processing device according to claim 1, wherein
the depth value calculation unit configured to calculate a division depth value of the block boundary based on block lengths of respective blocks adjacent to the left and right or upper and lower sides of the block boundary.

6. The information processing device according to claim 5, wherein
the depth value calculation unit based on calculate the division depth value of the block boundary based on a number of times of division of blocks corresponding to a longer block length among the block lengths of the respective blocks adjacent to the left and right sides of the block boundary or a number of times of division of blocks corresponding to a longer block length among the block lengths of the respective blocks adjacent to the upper and lower sides of the block boundary.

7. The information processing device according to claim 1, wherein
the filter processing execution determination unit is further configured to:
determine the deblocking filter is easier to operate on the block boundary as a division depth value of the block boundary is smaller, and determine the deblocking filter is more difficult to operate on the block boundary as the division depth value of the block boundary is larger.

8. The information processing device according to claim 7, wherein
the filter processing execution determination unit is further configured to:
loosely set a threshold to determine a flatness of a distribution of pixel values near the block boundary as the division depth value of the block boundary is smaller, and
strictly set the threshold to determine the flatness of the distribution of the pixel values near the block boundary as the division depth value of the block boundary is larger.

9. The information processing device according to claim 1, wherein
the filter strength setting unit is further configured to:
set the strength of the deblocking filter to be stronger as the division depth value of the block boundary is smaller, and
set the strength of the deblocking filter to be weaker as the division depth value of the block boundary is larger.

10. The information processing device according to claim 1, wherein
the filter strength setting unit is further configured to set the strength of the deblocking filter to be stronger in a case where a flatness of a distribution of pixel values near the block boundary is higher than a first specific value and a gap between pixel values of pixels sandwiching the block boundary is smaller than a second specific value.

11. The information processing device according to claim 1, further comprising a transmission information generation unit configured to store a determination result of the filter processing execution determination unit and a setting threshold set by the filter strength setting unit in a coded bit stream.

12. The information processing device according to claim 11, wherein
the transmission information generation unit is further configured to store, in a coded bit stream, a flag that switches presence or absence of processing of the deblocking filter at each block boundary and the setting threshold for each of the division depth values.

13. The information processing device according to claim 11, wherein the transmission information generation unit is further configured to store the setting threshold for each of the division depth values in a coded bit stream as a difference value from a specific reference value.

14. The information processing device according to claim 1, wherein
in a case where the image is represented by a luminance signal and a color difference signal,
the filter processing execution determination unit and the filter strength setting unit
perform execution determination and strength setting of the deblocking filter, respectively, on the luminance signal and the color difference signal, respectively.

15. An information processing method comprising:
calculating, for an image divided into a plurality of blocks, a depth value for determining presence or absence of processing of a deblocking filter and determining strength of the deblocking filter based on a division state of respective blocks adjacent to a block boundary;
determining whether or not to cause the deblocking filter to operate on the block boundary based on the depth value;
setting the strength of the deblocking filter to operate on the block boundary based on the depth value; and
calculating a division depth value of the block boundary based on a position of the block boundary in the image.

16. A non-transitory computer-readable medium having stored thereon computer-executable instructions that, when executed by a computer processor of an information processing device, cause the information processing device to function as:
a depth value calculation unit configured to calculate, for an image divided into a plurality of blocks, a depth value to determine presence or absence of processing of a deblocking filter and determine strength of the deblocking filter based on a division state of respective blocks adjacent to a block boundary;
a filter processing execution determination unit configured to determine whether or not to cause the deblocking filter to operate on the block boundary based on the depth value; and
a filter strength setting unit that sets the strength of the deblocking filter to operate on the block boundary based on the depth value, wherein the depth value calculation unit is further configured to calculate a division depth value of the block boundary based on a position of the block boundary in the image.

* * * * *